(12) United States Patent
Gondai et al.

(10) Patent No.: US 11,491,403 B2
(45) Date of Patent: *Nov. 8, 2022

(54) VIDEO GAME PROCESSING PROGRAM AND VIDEO GAME PROCESSING SYSTEM

(71) Applicant: KABUSHIKI KAISHA SQUARE ENIX, Tokyo (JP)

(72) Inventors: Mitsutoshi Gondai, Tokyo (JP); Masatoshi Ishikawa, Tokyo (JP); Tsuyoshi Yokozawa, Tokyo (JP); Takashi Sugi, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 294 days.

This patent is subject to a terminal disclaimer.

(21) Appl. No.: 16/902,913

(22) Filed: Jun. 16, 2020

(65) Prior Publication Data

US 2020/0306642 A1    Oct. 1, 2020

Related U.S. Application Data

(63) Continuation of application No. 16/238,192, filed on Jan. 2, 2019, now Pat. No. 10,717,006, which is a
(Continued)

(30) Foreign Application Priority Data

Jul. 17, 2015   (JP) ................................ 2015-143277

(51) Int. Cl.
| | |
|---|---|
| *A63F 13/00* | (2014.01) |
| *A63F 13/67* | (2014.01) |
| *A63F 13/35* | (2014.01) |

(52) U.S. Cl.
CPC .............. *A63F 13/67* (2014.09); *A63F 13/00* (2013.01); *A63F 13/35* (2014.09); *A63F 2300/535* (2013.01)

(58) Field of Classification Search
None
See application file for complete search history.

(56) References Cited

U.S. PATENT DOCUMENTS 5,683,082 A * 11/1997 Takemoto .......... A61B 17/3417
                                                    273/121 B
6,358,148 B1 * 3/2002 Tanaka .................... A63F 13/67
                                                    463/43
(Continued)

FOREIGN PATENT DOCUMENTS

JP        2014-090973        5/2014

*Primary Examiner* — Paul A D'Agostino
(74) *Attorney, Agent, or Firm* — Greenblum & Bernstein, P.L.C.

(57) ABSTRACT

A video game processing program product for causing a server to realize functions to control progress of a video game is provided. The functions include: a function to generate content in which at least one of the user or a character operated by the user is allowed to participate, in a case where a predetermined condition is satisfied; a function to store the number of participants who participate in first content and a clear time indicating a time required to clear the first content in a predetermined storage medium; a function to set up the degree of difficulty for second content indicating content to be generated newly; and a function to detect whether a generation condition contained in the predetermined condition to generate the second content is satisfied or not. The generating function includes a function to generate the second content with the degree of difficulty thus set up.

7 Claims, 18 Drawing Sheets

100: VIDEO GAME PROCESSING SYSTEM

Related U.S. Application Data continuation of application No. 15/205,516, filed on Jul. 8, 2016, now Pat. No. 10,201,759.

(56) References Cited

U.S. PATENT DOCUMENTS

| | | | | |
|---|---|---|---|---|
| 8,105,152 | B2* | 1/2012 | Tamura | A63F 13/833 463/7 |
| 9,283,486 | B2 | 3/2016 | Morioka | |
| 2001/0003099 | A1* | 6/2001 | Von Kohorn | H04N 7/0806 463/16 |
| 2001/0014620 | A1* | 8/2001 | Nobe | A63F 13/814 463/7 |
| 2002/0188361 | A1* | 12/2002 | Chudley | A63F 13/12 700/92 |
| 2003/0003995 | A1* | 1/2003 | Goden | A63F 13/847 463/42 |
| 2003/0109297 | A1* | 6/2003 | Fukutome | A63F 13/47 463/7 |
| 2005/0239538 | A1* | 10/2005 | Dixon | G07F 17/34 463/20 |
| 2007/0066403 | A1* | 3/2007 | Conkwright | A63F 13/803 463/43 |
| 2007/0191095 | A1* | 8/2007 | McLennan | G06F 8/10 463/30 |
| 2007/0202946 | A1* | 8/2007 | Matsuyama | A63F 13/10 463/7 |
| 2007/0232375 | A1* | 10/2007 | Izumi | A63F 13/42 463/7 |
| 2007/0254741 | A1* | 11/2007 | Lim | A63F 13/803 463/9 |
| 2008/0009340 | A1* | 1/2008 | Walker | G07F 17/32 463/25 |
| 2008/0188302 | A1* | 8/2008 | Haga | A63F 13/52 463/31 |
| 2008/0227538 | A1* | 9/2008 | Kelly | G07F 17/3262 463/25 |
| 2008/0242423 | A1* | 10/2008 | Kerr | G07F 17/3295 463/42 |
| 2008/0268943 | A1* | 10/2008 | Jacob | A63F 13/67 463/43 |
| 2009/0023497 | A1* | 1/2009 | Okuda | A63B 47/002 463/31 |
| 2009/0036201 | A1* | 2/2009 | Okuda | A63F 13/75 463/23 |
| 2010/0072699 | A1* | 3/2010 | Bress | G07F 17/38 273/121 A |
| 2010/0075761 | A1* | 3/2010 | Lord | A63F 13/85 463/43 |
| 2010/0144424 | A1* | 6/2010 | Rogers | A63F 13/10 463/30 |
| 2010/0240458 | A1* | 9/2010 | Gaiba | A63F 13/212 463/36 |
| 2010/0240978 | A1 | 9/2010 | LaBastide | |
| 2010/0279762 | A1* | 11/2010 | Sohn | A63F 13/58 463/23 |
| 2010/0323783 | A1* | 12/2010 | Nonaka | A63F 13/428 463/43 |
| 2011/0231262 | A1* | 9/2011 | Fukuda | G06Q 30/00 705/14.66 |
| 2011/0244964 | A1* | 10/2011 | Glynne-Jones | A63F 13/47 463/40 |
| 2011/0312407 | A1* | 12/2011 | Sakurai | A63F 13/497 463/23 |
| 2012/0021823 | A1* | 1/2012 | Youm | A63F 13/497 463/29 |
| 2012/0044141 | A1* | 2/2012 | Ueshima | A63F 13/426 345/158 |
| 2012/0058823 | A1* | 3/2012 | Minato | A63F 13/5252 463/32 |
| 2012/0064965 | A1* | 3/2012 | Kelly | G07F 17/3258 463/25 |
| 2012/0108997 | A1* | 5/2012 | Guan | A63F 13/46 600/545 |
| 2012/0122552 | A1* | 5/2012 | Youm | A63F 13/497 463/23 |
| 2012/0258780 | A1* | 10/2012 | Yamaguchi | A63F 13/533 463/4 |
| 2013/0005434 | A1* | 1/2013 | Takehiro | A63F 13/493 463/24 |
| 2013/0079078 | A1* | 3/2013 | Jung | A63F 13/80 463/9 |
| 2013/0130792 | A1* | 5/2013 | Crocker | A63F 13/537 463/31 |
| 2013/0260885 | A1* | 10/2013 | Beyr | A63F 13/814 463/32 |
| 2013/0281186 | A1* | 10/2013 | Kosuge | A63F 13/79 463/24 |
| 2013/0324256 | A1* | 12/2013 | Takagi | A63F 13/58 463/42 |
| 2014/0128156 | A1 | 5/2014 | Morioka | |

\* cited by examiner

Fig. 20

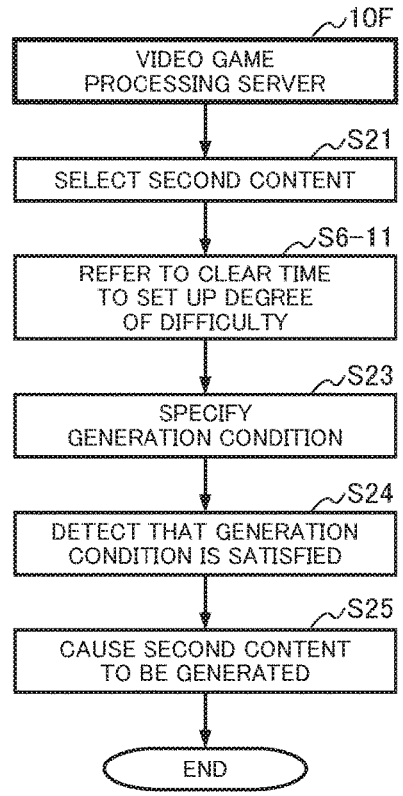

Fig. 21

| ID OF CONTENT | ... |
|---|---|
| COORDINATES OF CENTER POINT | ... |
| REGION | ... |
| LIMITED TIME | ... |
| DEGREE OF DIFFICULTY OF STANDARDS | ... |
| MAXIMUM NUMBER OF ENEMY CHARACTERS APPEARING WITHIN RANGE AT THE SAME TIME | ... |
| MONSTER ID | ... |
| MONSTER ID | ... |
| MONSTER ID | ... |
| RECOMMENDED NUMBER OF PARTICIPANTS | ... |
| ITEM ID TO BE COLLECTED | ... |
| BASIC REWARD (EXPERIENCE POINT) | ... |
| BASIC REWARD (CURRENCY) | ... |
| BASIC REWARD (ITEM) | ... |
| ID OF NEXT CONTENT AT CLEAR | ... |
| ID OF NEXT CONTENT AT FAILURE | ... |
| BASIC TIME UNTIL CONTENT IS GENERATED | ... |
| : | ... |

VIDEO GAME PROCESSING PROGRAM AND VIDEO GAME PROCESSING SYSTEM

CROSS-REFERENCE TO RELATED APPLICATION

The present application is a continuation application of U.S. patent application Ser. No. 16/238,192, filed on Jan. 2, 2019, which is Continuation of U.S. patent application Ser. No. 15/205,516, filed on Jul. 8, 2016 and now U.S. Pat. No. 10,201,759 issued on Feb. 12, 2019, which claims priority to Japanese Patent Application No. 2015-143277, filed on Jul. 17, 2015. The disclosure of each of these documents, including the specification, drawings, and claims, is incorporated herein by reference in its entirety.

BACKGROUND OF THE INVENTION

1. Field of the Invention

At least one of embodiments according to the present invention relates to a non-transitory computer-readable medium including a video game processing program and a video game processing system for causing a server to realize functions to control progress of a video game in response to an operation of a user.

2. Description of the Related Art

Heretofore, various techniques to generate an event in a video game have been proposed.

In such a system, for example, there is one in which content in which a plurality of players is allowed to participate (for example, an event) is generated (see Japanese Patent Application Publication No. 2014-090973).

However, with respect to such content, it is difficult to predict how many users participate in the content. For this reason, there has been a problem that the degree of difficulty intended by an administrator who manages a video game cannot be realized. For that reason, there has been a case where, even though content is generated, a merit of the generated content for the user to participate in becomes lower. For this reason, a technique to continue a desire to participate in content to be generated by generating the content with the degree of difficulty intended by the administrator who manages the video game has been required.

SUMMARY OF THE INVENTION

It is an object of at least one of embodiments according to the present invention to solve the problem described above, and to cause a user to continue his or her desire to participate in content to be generated.

According to one non-limiting aspect of the present invention, there is provided a non-transitory computer-readable medium including a video game processing program product for causing a server to realize functions to control progress of a video game in response to an operation of a user.

The functions include a generating function configured to generate content in a case where a predetermined condition is satisfied, at least one of the user or a character operated by the user being allowed to participate in the content.

The functions also include a storing function configured to store the number of participants who participate in first content and a clear time in a predetermined storage medium, the first content indicating one content of the contents which is recently generated, the clear time indicating a time required to clear the first content.

The functions also include a setting function configured to refer to the number of participants and the clear time to set up the degree of difficulty for second content, the second content indicating content to be generated newly.

The functions also include a detecting function configured to detect whether a generation condition is satisfied or not, the generation condition being contained in the predetermined condition, the generation condition being a condition to generate the second content.

In this case, the generating function includes a function configured to generate the second content with the degree of difficulty that was set up by the setting function in a case where the detecting function detects that the generation condition is satisfied.

According to another non-limiting aspect of the present invention, there is provided a video game processing system including a communication network, a server and a user terminal, the video game processing system being configured to control progress of a video game in response to an operation of a user.

The video game processing system includes a generating section configured to generate content in a case where a predetermined condition is satisfied, at least one of the user or a character operated by the user being allowed to participate in the content.

The video game processing system also includes a storing section configured to store the number of participants who participate in first content and a clear time in a predetermined storage medium, the first content indicating one content of the contents which is recently generated, the clear time indicating a time required to clear the first content.

The video game processing system also includes a setting section configured to refer to the number of participants and the clear time to set up the degree of difficulty for second content, the second content indicating content to be generated newly.

The video game processing system also includes a detecting section configured to detect whether a generation condition is satisfied or not, the generation condition being contained in the predetermined condition, the generation condition being a condition to generate the second content.

In this case, the generating section generates the second content with the degree of difficulty that was set up by the setting section in a case where the detecting section detects that the generation condition is satisfied.

According to still another non-limiting aspect of the present invention, there is provided a non-transitory computer-readable medium including a video game processing program product for causing a user terminal to realize functions to control progress of a video game in response to an operation inputted into the user terminal by a user.

The server includes a generating function configured to generate content in a case where a predetermined condition is satisfied, at least one of the user or a character operated by the user being allowed to participate in the content.

The server also includes a storing function configured to store the number of participants who participate in first content and a clear time in a predetermined storage medium, the first content indicating one content of the contents which is recently generated, the clear time indicating a time required to clear the first content.

The server also includes a setting function configured to refer to the number of participants and the clear time to set up the degree of difficulty for second content, the second content indicating content to be generated newly.

The server also includes a detecting function configured to detect whether a generation condition is satisfied or not, the generation condition being contained in the predetermined condition, the generation condition being a condition to generate the second content.

In this case, the generating function includes a function configured to generate the second content with the degree of difficulty that was set up by the setting function in a case where the detecting function detects that the generation condition is satisfied.

Further, the functions includes a receiving function configured to receive, from the server, information for outputting a game screen indicating a progress status of the video game.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 20 is a flowchart showing an example of the game processing corresponding to at least one of the embodiments according to the present invention.

FIG. 21 is an explanatory drawing for explaining an example of a storage state of information corresponding to at least one of the embodiments according to the present invention.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

First Embodiment

Figure 1:
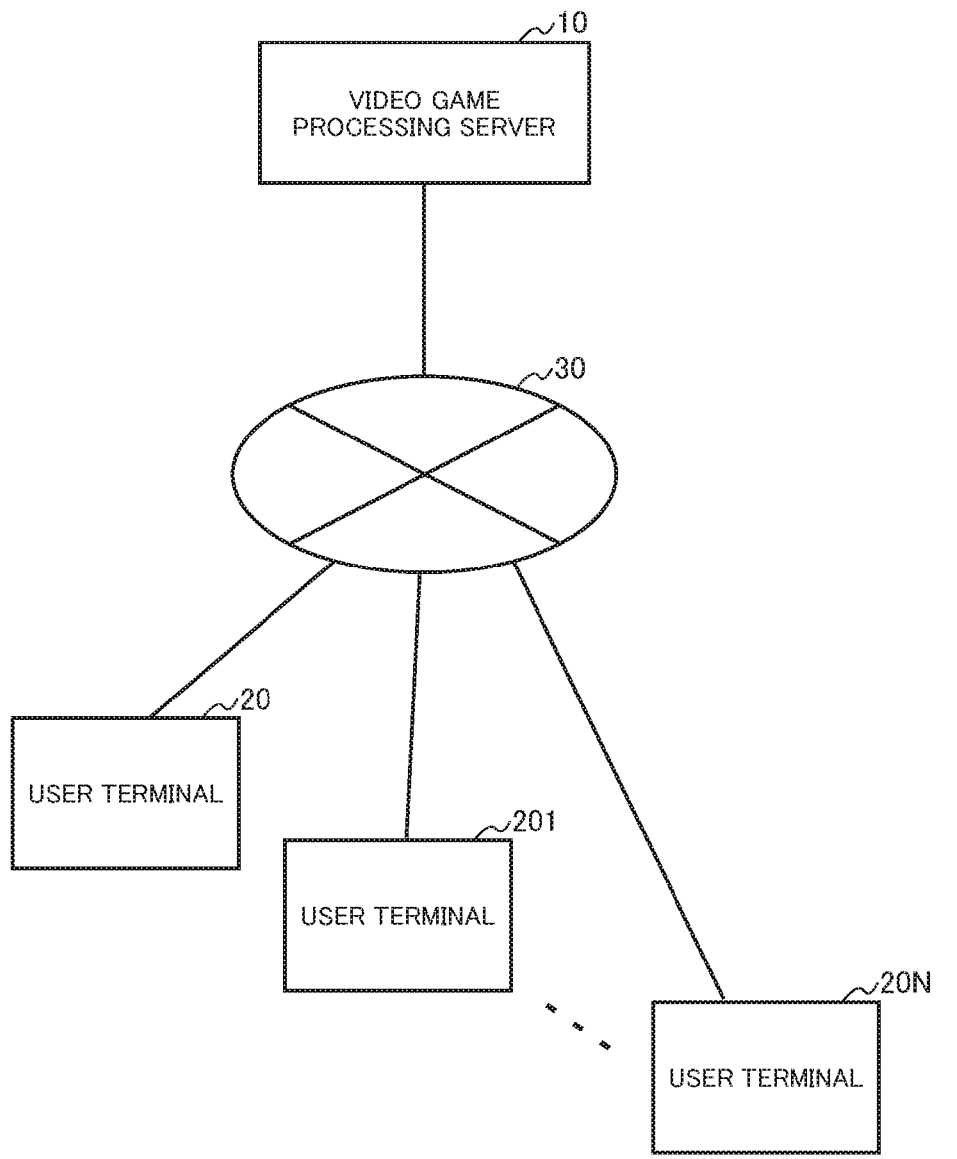
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10, and user terminals 20 and 201 to 20N ("N" is an arbitrary integer) respectively used by a plurality of users (players) who play a video game. In this regard, the configuration of the video game processing system 100 is not limited to this configuration. The video game processing system 100 may be configured so that the plurality of users uses a single user terminal, or may be configured so as to include a plurality of servers.

Each of the video game processing server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the video game processing server 10 and the plurality of user terminals 20, 201 to 20N, whereby various kinds of functions for controlling progress of the video game in response to an operation of the user are realized.

The video game processing server 10 is managed by an administrator of the video game processing system. 100, and has various kinds of functions to provide information regarding the video game to the plurality of user terminals 20, 201 to 20N. In the present embodiment, the video game processing server 10 is constructed by an information processing apparatus, such as a WWW server, and includes a storage medium for storing various kinds of information. In this regard, the video game processing server 10 is provided with a general configuration for carrying out the video game, such as a control section (a processer) and a communicating section. However, its explanation herein is omitted. Further, in the video game processing system 100, it is preferable that the video game processing server 10 manages information regarding the video game from a point of view to reduce a processing load on each of the plurality of user terminals 20, 201 to 20N. However, the storing section for storing the various kinds of information may include a storage region with a state that the video game processing server 10 can access the storage region. For example, the video game processing server 10 may be configured so as to be provided with a dedicated storage region outside the video game processing server 10.

Figure 2:
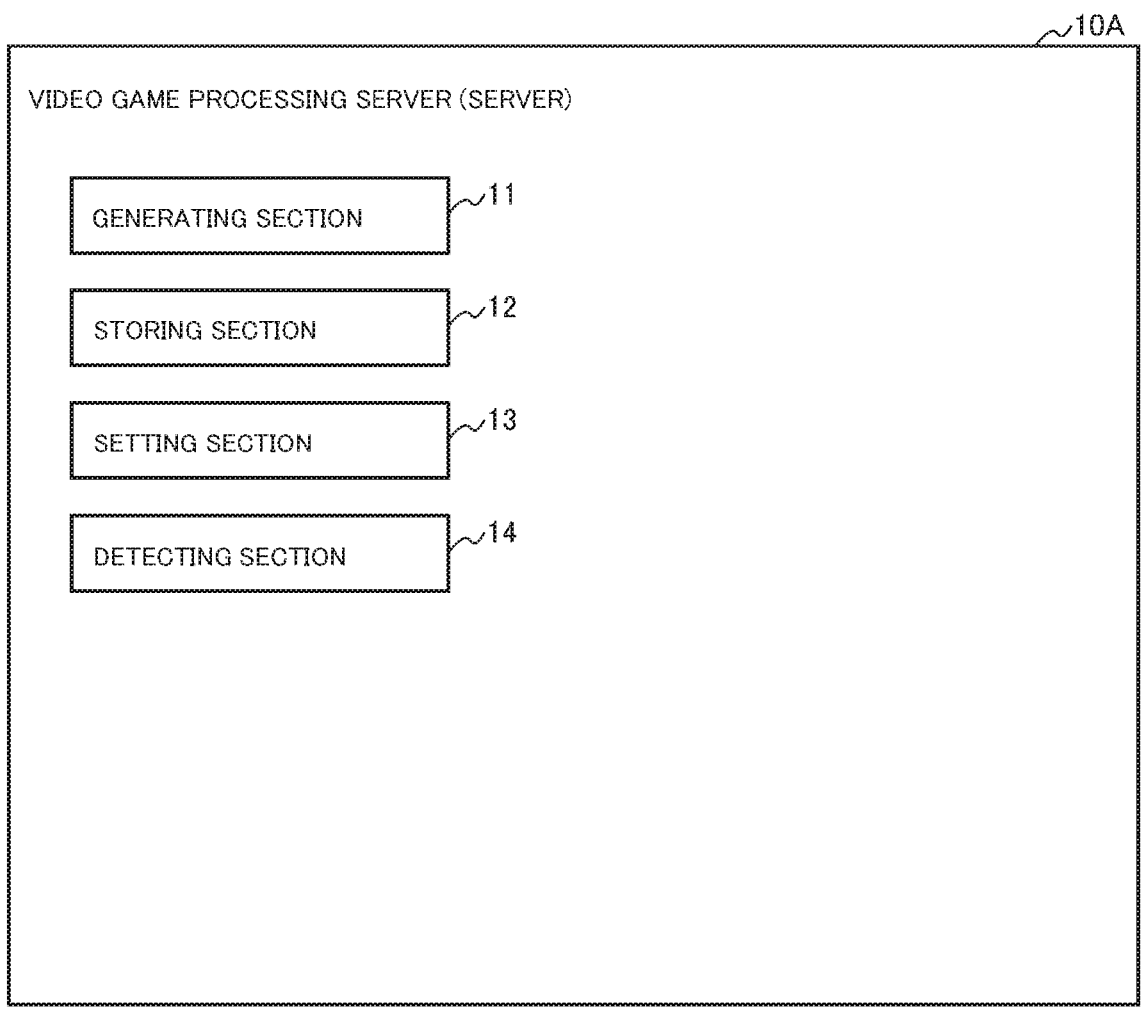
FIG. 2 is a block diagram showing a configuration of a video game processing server corresponding to at least one of the embodiments according to the present invention.

FIG. 2 is a block diagram showing a configuration of a video game processing server 10A (hereinafter, referred to as a "server 10A") that is an example of the configuration of the video game processing server 10. The server 10A at least includes a generating section 11, a storing section 12, a setting section 13, and a detecting section 14. Here, the processer of the video game processing server 10 may be configured so as to perform the various kinds of process described below.

The generating section 11 has a function to generate content, in which a character operated by at least one user or the user (hereinafter, also referred to simply as a "user") can participate, in a case where a predetermined condition is satisfied. Further, the generating section 11 also has a function to generate second content with the degree of difficulty set up by the setting section 13 in a case where the detecting section 14 detects that a generation condition is satisfied. The "generation condition", "the degree of difficulty" and the "second content" will be described later in detail.

Here, the "content" means one unit of a service in the video game. Although the configuration of the content is not limited particularly, it is preferable that a termination condition is defined. It is preferable that the termination condition is clear of the content or failure of the content. As examples of the content, there are content that one user plays by oneself, and content that users of a predetermined number play at the same time. Further, as examples of the content that a plurality of users plays at the same time, there are content in which the plurality of users cooperate with each other and content in which the users fight against each other.

Further, the "predetermined condition" means a condition set up as timing when content is to be generated. As examples of the predetermined condition, there are a condition when a fixed time elapses, a condition that a predetermined operation is received after the fixed time elapses, and the like.

Further, the word "generate" indicates a state where a quest is caused to appear in a game screen displayed in each of the user terminals 20 and 201 to 20N. For example, by transmitting, to each of the user terminals 20 and 201 to 20N, a game screen in which a quest generated by the server 10A is caused to appear, the server 10A generates the quest.

The storing section 12 has a function to store, in a predetermined storage medium, the number of participants who participate in content recently generated (hereinafter, also referred to as a "first content") and a clear time indicating a time required to clear the first content. The number of participants and the clear time may be stored in storage media separately.

Here, the word "participate in" means that the user contributes the first content. Therefore, "the number of participants" means the number of users who contribute the first content. As examples of the "user who contributes", there are a user who defeats an enemy character that appears in the content, a user who exists in a predetermined range from a position at which the content is generated, and the like.

Further, the phrase "clear the content" means that a clear condition set up for the content is satisfied. As examples of the clear condition, there are a case where an enemy boss character that appears as the content is defeated, a case where an item that appears as the content is collected, and the like, for example. On the other hand, the word "fail the content" means a case where a clear condition set up for content is not satisfied and a limited time for the content is up (or elapses), a case where a failure condition set up for content is succeeded, or the like.

The setting section 13 has a function to refer to the number of participants and a clear time to set up the degree of difficulty for content to be newly generated (hereinafter, also referred to as "second content"). Here, the second content is selected in accordance with a predetermined rule when the first content is terminated, for example. Therefore, when certain content (first content) is terminated, content that is to be carried out next time (second content) is determined. The content is justly not limited to such a configuration. The server 10A may be configured so that the second content is selected in a progress status of the video game after a predetermined period of time elapses from a time when the first content was terminated.

Here, "the degree of difficulty" is an index indicating the degree of difficulty of the content. As examples of the degree of difficulty, there are strength of an enemy, the number of enemies, and the like. The server 10A is configured so that the setting section 13 sets up the final degree of difficulty by correcting the degree of difficulty that becomes a standard.

The detecting section 14 has a function to detect whether a predetermined condition to generate the second content (hereinafter, also referred to as a "generation condition") is satisfied or not. The detecting section 14 may be configured so as to: specify a generation condition in advance; and determine whether the generation condition is satisfied or not at predetermined intervals. Alternatively, the detecting section 14 may be configured so as to detect that the generation condition is satisfied on the basis of an operation of the user.

Each of the plurality of user terminals 20, 201 to 20N is managed by a user (or a player) who plays the video game, and is configured by a communication terminal, such as a cellular phone terminal, a PDA (Personal Digital Assistants), and a mobile game device, by which the user can play a network delivery type game, for example. In this regard, the configuration of the user terminal that the video game processing system 100 can include is not limited to the examples described above. However, the user terminal may be configured so that the user can recognize the video game. As the other example of the configuration of the user terminal, there is a so-called wearable divide such as a smart watch, a combination of the wearable device and the communication terminal, and the like.

Further, each of the plurality of user terminals 20, 201 to 20N is connected to the communication network 30, and includes hardware (for example, the display device for displaying a game screen, an audio output device and the like) and software for carrying out the video game by communicating with the video game processing server 10. In this regard, each of the plurality of user terminals 20, 201 to 20N may be configured so as to be capable of directly communicating with each other without the video game processing server 10. Further, as the configuration in which each of the plurality of user terminals 20, 201 to 20N receives the user operation, each of the plurality of user terminals 20, 201 to 20N may be configured so as to include a touch panel corresponding to the game screen, for example.

Next, an operation of the video game processing system 100 (hereinafter, referred to as a "system 100") according to the present embodiment will be described.

Figure 3:
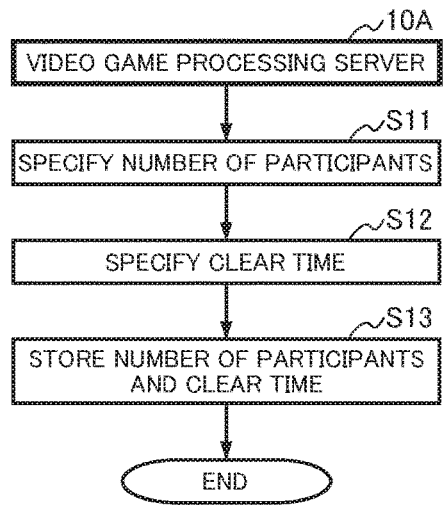
FIG. 3 is a flowchart showing an example of storing processing corresponding to at least one of the embodiments according to the present invention.

FIG. 3 is a flowchart showing an example of storing processing carried out by the system 100. In the storing processing according to the present embodiment, a process to store various kinds of information regarding the first content is carried out.

The storing processing according to the present embodiment is started in a case where the first content is generated in accordance with progress of the video game, for example. In this regard, the word "in accordance with progress of the video game" means that occurrence of various kinds of progress or changes and the like that can be generated in the video game becomes timing or a standard of a specific process. As examples of the specific process, there are a determining process, an information updating process, and the like. Further, as examples of the various kinds of progress or changes that can be generated in the video game, there are progress of time, a change in a game element value, a specific status or update of a flag, an operation input by the user, and the like.

In the storing processing, the server 10A first specifies the number of participants in the first content (Step S11). In the present embodiment, the server 10A refers to list information that is in turn published in a case where the user makes a contribution to the content, and specifies the final number of participants.

When the number of participants is specified, the server 10A specifies a clear time (Step S12). Although it is not shown in the drawings particularly in the present embodiment, the server 10A measures a period of time from a time when the content is started to a time when the content is terminated using a timing function included in the server 10A.

When the number of participants and the clear time are specified, the server 10A stores the specified information in a storage medium (Step S13), and terminates the processing herein.

Figure 4:
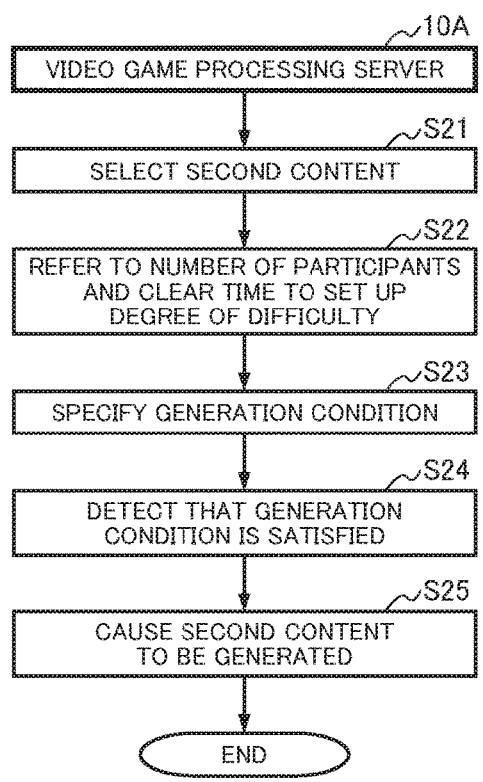
FIG. 4 is a flowchart showing an example of game processing corresponding to at least one of the embodiments according to the present invention.

FIG. 4 is a flowchart showing an example of the game processing carried out by the system 100. In the game processing according to the present embodiment, a process related to generation of second content is carried out.

The game processing according to the present embodiment is started in a case where a condition to start a generating process of second content is satisfied in accordance with progress of the video game, for example. The case where the condition to start the generating process of second content is satisfied means a condition that the first content is terminated, for example.

In the game processing, the server 10A selects second content (Step S21). The selection of the content according to the present embodiment is carried out in accordance with a predetermined rule.

When the second content is selected, the server 10A refers to the number of participants in the first content and the clear time for the first content to set up the degree of difficulty for the selected second content (Step S22).

When the degree of difficulty is set up, the server 10A specifies a generation condition (Step S23). In the present embodiment, the case where a condition "the elapse of a fixed time" is set up as the generation condition will be described as an example.

When the generation condition is specified, the server 10A detects whether the generation condition is satisfied (Step S24). In the present embodiment, the server 10A detects whether the fixed time elapses or not.

When it is detected that the generation condition is satisfied, the server 10A generates the second content with the degree of difficulty thus set up (Step S25), and terminates the processing herein. In the present embodiment, the server 10A transmits information regarding a game screen, in which the second content is caused to appear in a virtual space, to the terminal 20. Then, when the terminal 20 receives the information regarding the game screen and outputs the game screen on the basis of the information regarding the game screen, the game processing to generate the second content is terminated.

Figure 5:
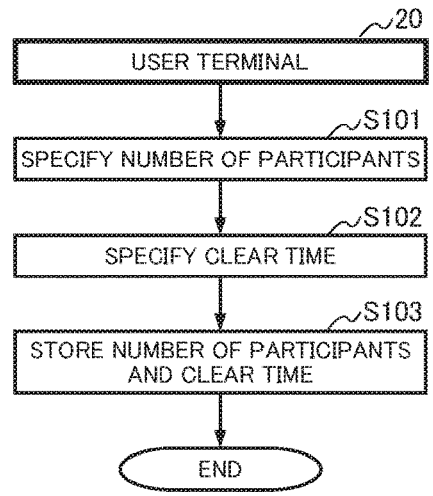
FIG. 5 is a flowchart showing an example of an operation of a terminal side in the storing processing corresponding to at least one of embodiments according to the present invention.

FIG. 5 is a flowchart showing an example of an operation of the terminal 20 side in a case where the terminal 20 carries out the storing processing. Hereinafter, the case where the terminal 20 carries out the storing processing will be described as an example. Namely, in the present embodiment, the case where the terminal 20 has functions of the respective sections included in the server 10A will be described.

In the storing processing, the terminal 20 first specifies the number of participants in the first content (Step S101). In the present embodiment, the terminal 20 refers to the list information that is in turn published in a case where the user makes a contribution to the content, and specifies the final number of participants.

When the number of participants is specified, the terminal 20 specifies the clear time (Step S102). In the present embodiment, it is not shown in the drawings particularly, but the terminal 20 measures a period of time from a time when the content is started to a time when the content is terminated using a timing function included in the terminal 20.

When the number of participants and the clear time are specified, the terminal 20 stores the specified information in a storage medium (Step S103), and terminates the processing herein.

Figure 6:
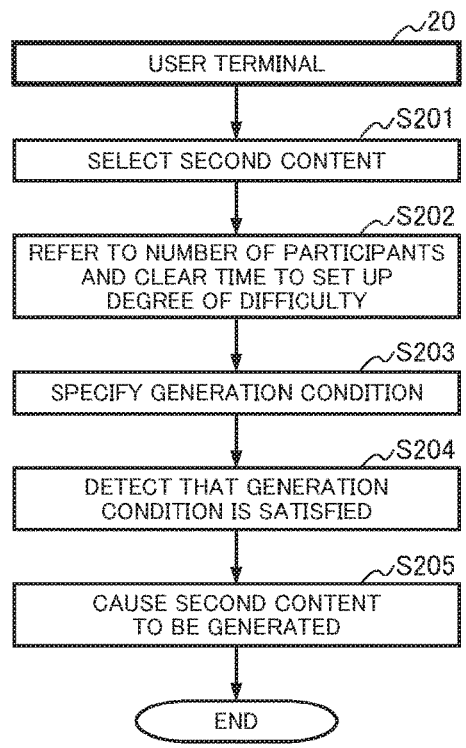
FIG. 6 is a flowchart showing an example of an operation of a terminal side in the game processing corresponding to at least one of the embodiments according to the present invention.

FIG. 6 is a flowchart showing an example of an operation of the terminal 20 side in a case where the terminal 20 carries out the game processing. Hereinafter, a case where the terminal 20 carries out the game processing will be described as an example. Namely, in the present embodiment, a case where the terminal 20 has the functions of the respective portions included in the server 10A will be described.

In the game processing, the terminal 20 selects second content (Step S201).

When the second content is selected, the terminal 20 refers to the number of participants in the first content and the clear time for the first content to set up the degree of difficulty for the selected second content (Step S202).

When the degree of difficulty is set up, the terminal 20 specifies a generation condition (Step S203).

When the generation condition is specified, the terminal 20 detects whether the generation condition is satisfied or not (Step S204).

When it is detected that the generation condition is satisfied, the terminal 20 generates second content with the degree of difficulty thus set up (Step S205), and terminates the processing herein. In the present embodiment, the terminal 20 outputs a game screen in which the second content is caused to appear in the virtual space, and terminates the game processing to generate the second content.

As explained above, as one side of the first embodiment, the video game processing server 10A for controlling progress of the video game in response to an operation of the user is configured so as to include the generating section 11, the storing section 12, the setting section 13, and the detecting section 14. For that reason, the video game processing server 10A is configured so as to: generate the content in which at least one of the users or the characters operated by the users is allowed to participate; in a case where the predetermined condition is satisfied, store the number of participants who participate in the first content indicating the content that is generated recently and the clear time indicating a time required to clear the first content in a predetermined storage medium; refer to the number of participants and the clear time to set up the degree of difficulty for the second content indicating the content to be newly generated; and detect whether the generation condition to generate the second content of predetermined conditions is satisfied or not. This makes it possible to generate the second content with the degree of difficulty thus set up in a case where it is detected that the generation condition is satisfied. Therefore, it becomes possible to appropriately set up the degree of difficulty for the content, and it becomes possible to cause the user to continue his or her desire to participate in content to be generated.

Namely, even in a case of using content in which it is difficult to predict the number of participants, it becomes possible to set up the degree of difficulty suitable for the content. For this reason, it becomes possible to cause the user to continue his or her desire to participate in content to be generated.

In this regard, it has not been mentioned particularly in the example of the first embodiment described above. However, the server 10A may be configured so as to: determine a start time of the second content by detecting that it is the start time; and detect that the generation condition is satisfied.

In this regard, it has not been mentioned particularly in the example of the first embodiment described above. However, the server 10A may be configured so as to make a generation interval of the second content longer than the usual when the content ends in failure the predetermined number of times in a row.

In this regard, it has not been mentioned particularly in the example of the first embodiment described above. However, the server 10A may be configured so as to: give a reward to the user or the character operated by the user who participates in the content when the content is terminated; and increase or decrease the reward to be given in accordance with the degree of contribution to the content when to give the reward. Here, the reward includes an item that the user can use, equipment, an in-game currency, and an experience point. Further, "the degree of contribution" mentioned herein indicates how much the user of the users who contribute the content contributes the content. As examples of the degree of contribution, there are the number of enemy characters that were defeated, a rate of a damage applied by the user with respect to a total damage that an enemy character receives, and the like.

In this regard, it has not been mentioned particularly in the example of the first embodiment described above. However, the server 10A may be configured so as to give, when a reward is given, the reward regardless of whether the content is cleared or not.

In this regard, it has not been mentioned particularly in the example of the first embodiment described above. However, continuous content that is generated so as to be linked together may be contained in the content, and the server 10A may be configured so as to: determine whether the continuous content is contained in the second content or not; and generate, when the second content is terminated, continuous content in a case where it is determined that the continuous content is contained.

In this regard, it has not been mentioned particularly in the example of the first embodiment described above. However, the server 10A may be configured so as to, when content is to be generated, suddenly generate the content in which at least one of the users is allowed to participate in a case where the predetermined condition is satisfied. Here, the phrase "suddenly generate the content" means that the content is generated without informing the user of it in advance. In this regard, a "suddenly" status stated herein contains a status that the user has not been informed until right before. According to such a configuration, even in a case of using content in which it is difficult to predict the number of participants due to sudden generation of content, it becomes possible to set up the degree of difficulty suitable for the content. Therefore, it becomes possible to cause the user to continue his or her desire to participate in content to be generated.

In this regard, it has not been mentioned particularly in the example of the first embodiment described above. However, the server 10A may be configured so as to refer, when the degree of difficulty for the second content is determined, to the users who play the video game when the second content is generated, and set up the degree of difficulty for the second content. According to such a configuration, even in a case of using content in which it is difficult to predict the number of participants, it becomes possible to set up the degree of difficulty suitable for the content. Therefore, it becomes possible to cause the user to continue his or her desire to participate in content to be generated. Here, the language "refer to the users who play the video game when the second content is generated" contains referring to the number of users who play the video game when the second content is generated.

In this regard, it has not been mentioned particularly in the example of the first embodiment described above. However, the server 10A may be configured so as to: refer, when the degree of difficulty for the second content is determined, to the number of users each of who has a predetermined strength or status (for example, a level of the user or a job of the user; more specifically, a level that falls into a range of ten difference with respect to a recommended level of the content, a predetermined job, and the like) to set up the degree of difficulty for the second content. According to such a configuration, even in a case of using content in which it is difficult to predict the number of participants, it becomes possible to set up the degree of difficulty suitable for the content. Therefore, it becomes possible to cause the user to continue his or her desire to participate in content to be generated.

In this regard, it has not been mentioned particularly in the example of the first embodiment described above. However, the server 10A may be configured so as to: refer, when the degree of difficulty for the second content is determined, to the number of users who possess an in-game element for participating in predetermined content; and set up the degree of difficulty for the second content. According to such a configuration, even in a case of using content in which it is difficult to predict the number of participants, it becomes possible to set up the degree of difficulty suitable for the content. Therefore, it becomes possible to cause the user to continue his or her desire to participate in content to be generated. Here, as the "in-game element for participating in the predetermined content", there are activity (an action point), a ticket, and the like, for example.

In this regard, it has not been mentioned particularly in the example of the first embodiment described above. However, the server 10A may be configured so as to: refer to the number of users or the number of characters operated by users in addition to the number of participants and the clear time, the users or characters being positioned within the predetermined range from the position at which the second content is to be generated; and set up the degree of difficulty for the second content. According to such a configuration, even in a case of using content in which it is difficult to predict the number of participants, it becomes possible to set up the degree of difficulty suitable for the content. Therefore, it becomes possible to cause the user to continue his or her desire to participate in content to be generated.

Second Embodiment

Figure 7:
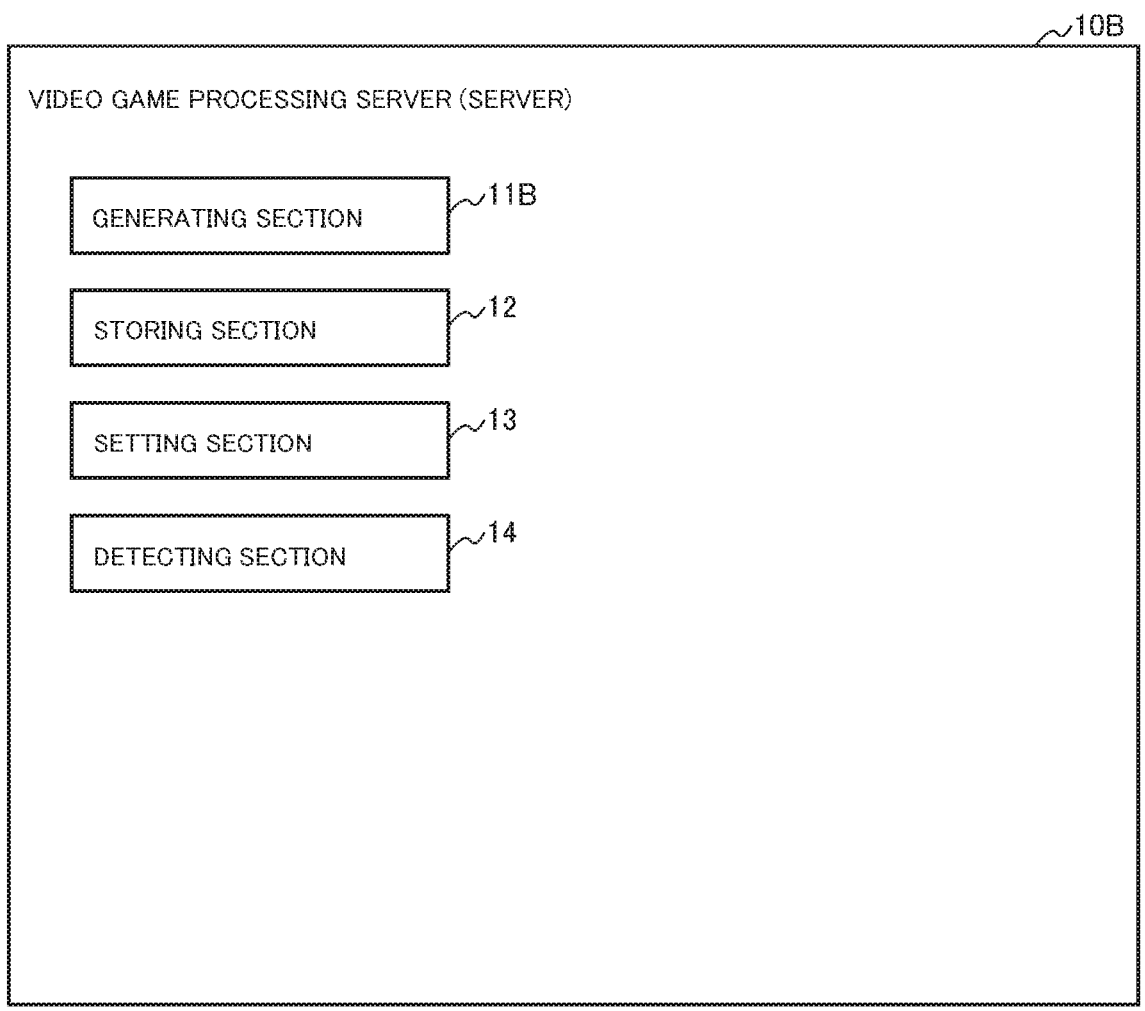
FIG. 7 is a block diagram showing a configuration of the video game processing server corresponding to at least one of the embodiments according to the present invention.

FIG. 7 is a block diagram showing a configuration of a video game processing server 10B (hereinafter, referred to as a "server 10B"), which is an example of the video game processing server 10. In the present embodiment, the server 10B at least includes a generating section 11B, a storing section 12, a setting section 13, and a detecting section 14.

The generating section 11B has a function to generate content at a predetermined position in a region in which the user or the character operated by the user is allowed to move.

Here, "the region in which the user or the character operated by the user is allowed to move" includes a virtual space in a video game such as a massively multiplayer online role-playing game (a so-called MMORPG), a region for stage selection in a stage type video game constituted by a plurality of stages, a region to select a quest in a video game in which one quest can be selected from a list of quests, and the like.

Figure 8:
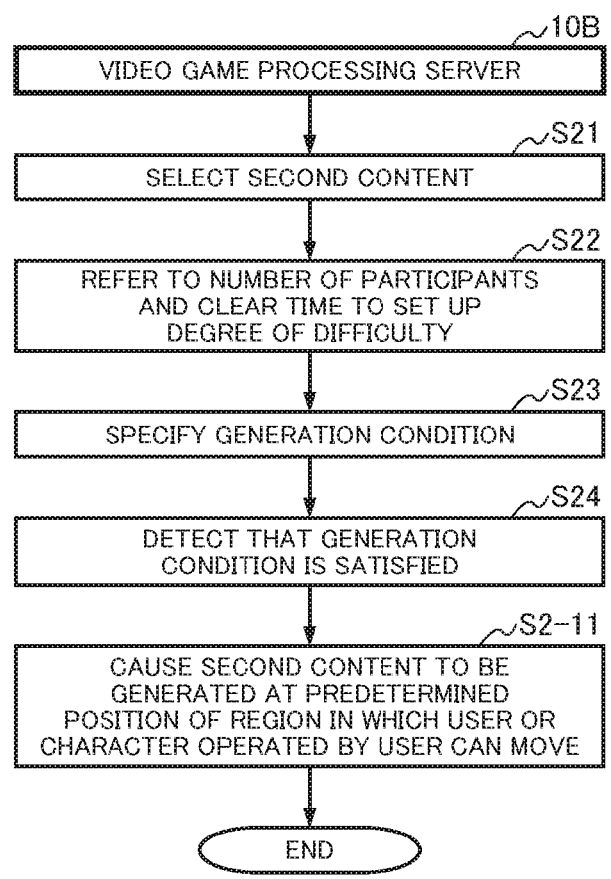
FIG. 8 is a flowchart showing an example of the game processing corresponding to at least one of the embodiments according to the present invention.

FIG. 8 is a flowchart showing an example of the game processing carried out by the system 100. Hereinafter, operations of the server 10B and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

When it is detected that a generation condition is satisfied (Step S24), the server 10B generates the second content with the degree of difficulty thus set up at a predetermined position in a region in which the user or the character operated by the user is allowed to move (Step S2-11). For example, the server 10B specifies a predetermined position, at which the content is generated, by referring to positional information associated with the second content, and generates the second content at the specified predetermined position.

When the second content is generated, the server 10B terminates the processing herein.

As explained above, as one side of the second embodiment, the video game processing server 10B is configured so as to include the generating section 11B, the storing section 12, the setting section 13, and the detecting section 14. For that reason, the server 10B is configured so as to generate content at a predetermined position in a region in which the user or the character operated by the user is allowed to move to cause the generated content to appear at an uncertain position. Therefore, even in a case of using content in which it is difficult to predict the number of participants, it becomes possible to set up the degree of difficulty suitable for the content. Therefore, it becomes possible to cause the user to continue his or her desire to participate in content to be generated.

In this regard, it has not been mentioned particularly in the example of the first embodiment described above. However, the server 10B may be configured so as to: generate the generation condition in a region in which the user or the character operated by the user can move; and detect whether the generation condition is satisfied or not in accordance with an operation of the user against the generation condition generated in the region. As concrete examples of the phrase "generate the generation condition in the region in which the user or the character operated by the user can move", there are a case where a predetermined enemy character is defeated within the region in which the user or the character operated by the user can move, a case where the player obtains a predetermined item within the region in which the user or the character operated by the user can move, and the like.

Second-1 Embodiment

Figure 9:
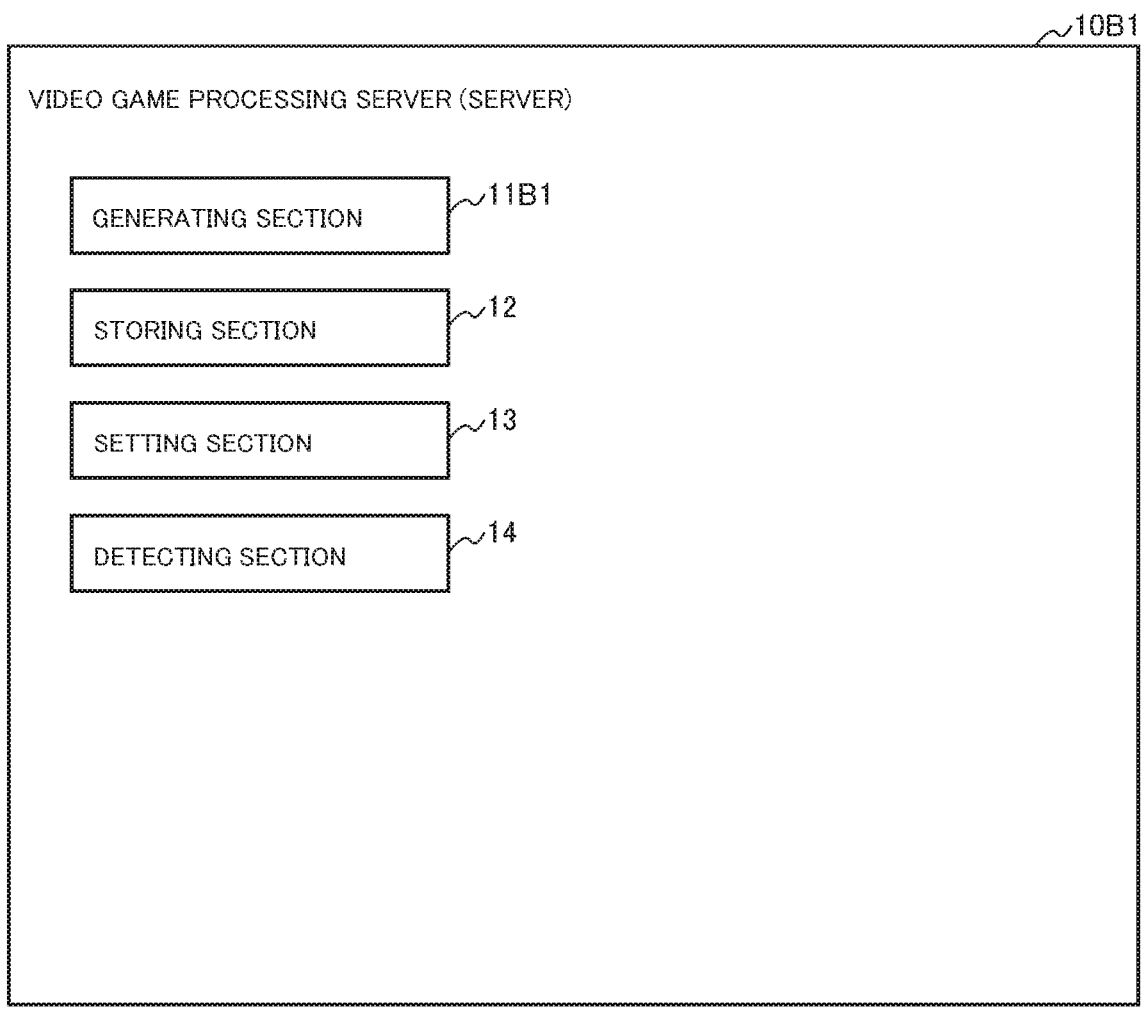
FIG. 9 is a block diagram showing a configuration of the video game processing server corresponding to at least one of the embodiments according to the present invention.

FIG. 9 is a block diagram showing a configuration of a video game processing server 10B1 (hereinafter, referred to as a "server 10B1"), which is an example of the video game processing server 10. In the present embodiment, the server 10B1 at least includes a generating section 11B1, a storing section 12, a setting section 13, and a detecting section 14. Moreover, in the present embodiment, content is content that is to be generated within a virtual space in a video game in which a large number of users participate in the same virtual space at the same time, such as a massively multiplayer online role-playing game (a so-called MMORPG).

The generating section 11B1 has a function to generate content at a predetermined position on a field within the virtual space.

Figure 10:
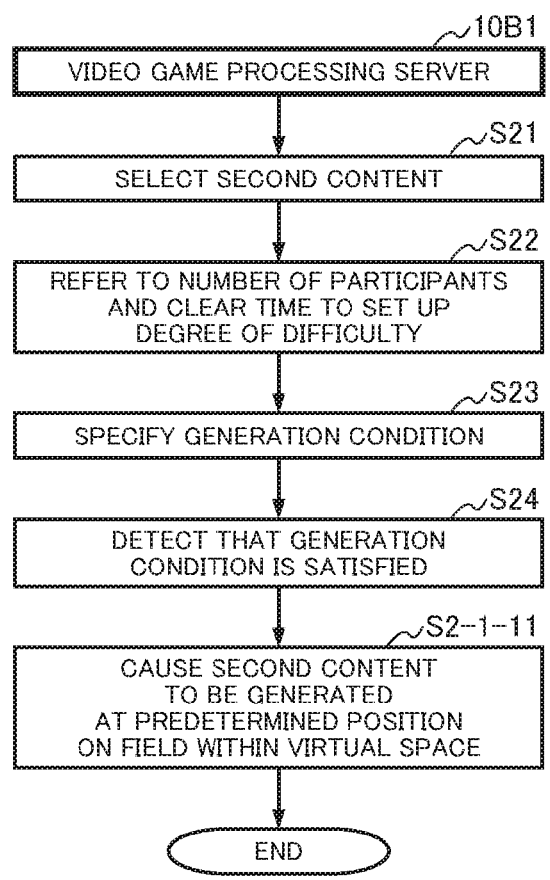
FIG. 10 is a flowchart showing an example of the game processing corresponding to at least one of the embodiments according to the present invention.

FIG. 10 is a flowchart showing an example of the game processing carried out by the system 100. Hereinafter, operations of the server 10B1 and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

When it is detected that a generation condition is satisfied (Step S24), the server 10B1 generates second content with the degree of difficulty thus set up in a predetermined position on the field within the virtual space (Step S2-1-11).

When the second content is generated, the server 10B1 terminates the processing herein.

As explained above, as one side of the second-1 embodiment, the video game processing server 10B1 is configured so as to: at least include the generating section 11B1, the storing section 12, the setting section 13, and the detecting section 14; and generate the second content to be generated within the virtual space, which is content to be generated within the virtual space in the video game in which a large number of users participates in the same virtual space at the same time, at a predetermined position of the field within the virtual space. Even in a case of using content in which it is difficult to predict the number of participants, it becomes possible to set up the degree of difficulty suitable for the content. Therefore, it becomes possible to cause the user to continue his or her desire to participate in content to be generated.

Second-2 Embodiment

Figure 11:
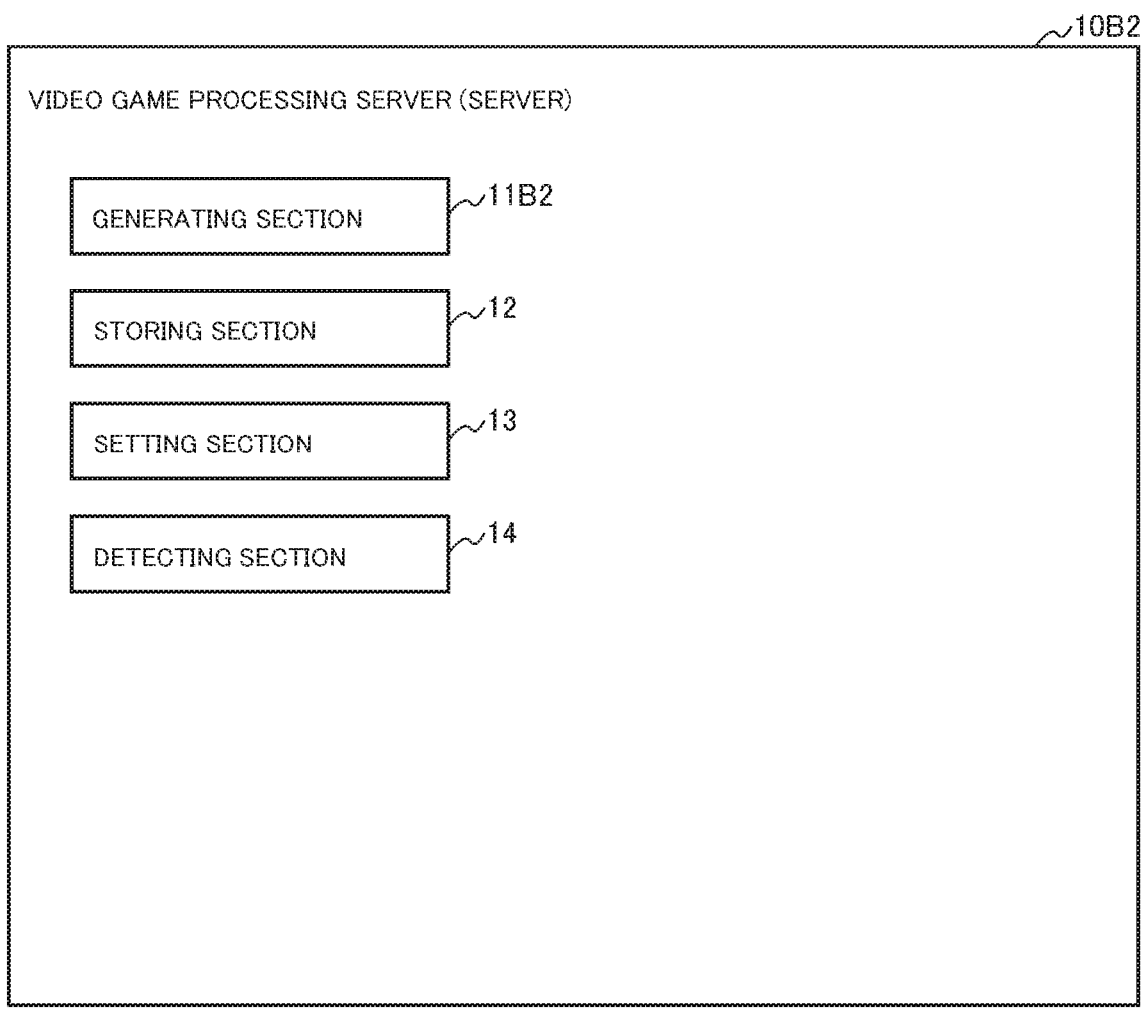
FIG. 11 is a block diagram showing a configuration of the video game processing server corresponding to at least one of the embodiments according to the present invention.

FIG. 11 is a block diagram showing a configuration of a video game processing server 10B2 (hereinafter, referred to as a "server 10B2"), which is an example of the video game processing server 10. In the present embodiment, the server 10B2 at least includes a generating section 11B2, a storing section 12, a setting section 13, and a detecting section 14. Moreover, content is content used in a multiplayer participation type online RPG (so-called, MORPG) or the like, for example, and is content for which a space dedicated to the content is to be generated.

The generating section 11B2 has a function to generate a space dedicated to second content.

Figure 12:
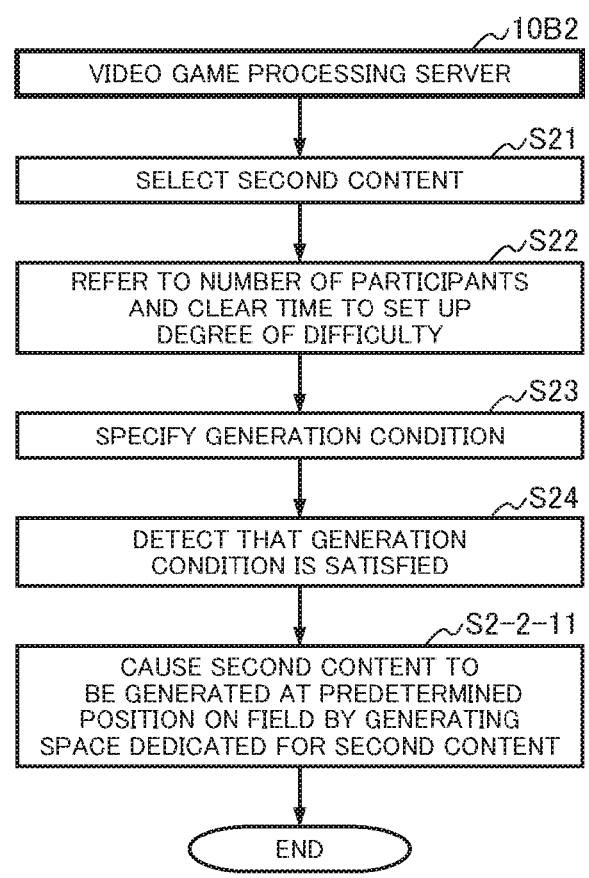
FIG. 12 is a flowchart showing an example of the game processing corresponding to at least one of the embodiments according to the present invention.

FIG. 12 is a flowchart showing an example of the game processing carried out by the system 100. Hereinafter, operations of the server 10B2 and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

When it is detected that the generation condition is satisfied (Step S24), the server 10B2 generates the second content by generating a space dedicated to the second content with the degree of difficulty thus set up (Step S2-2-11).

When the second content is generated, the server 10B2 terminates the processing herein.

As explained above, as one side of the second-1 embodiment, the video game processing server 10B1 is configured: so as to at least include the generating section 11B1, the storing section 12, the setting section 13, and the detecting section 14; so that the content is content for which a space dedicated to the content is to be generated; and so as to generate the second content by generating a space dedicated to the second content with the degree of difficulty thus set up. Even in a case of using content in which it is difficult to predict the number of participants, it becomes possible to set up the degree of difficulty suitable for the content. Therefore, it becomes possible to cause the user to continue his or her desire to participate in content to be generated.

Second-3 Embodiment

Although it is not shown in the drawings particularly, the video game processing server 10 may be configured, as one example, so as to generate an event in which a plurality of users is allowed to participate as content, for example. Here, the "event" is an event such as a raid battle in a so-called social game, and indicates content that is displayed so that the user can select. As an example of the event, there is an event in which, when the event is selected, a battle process between a user who selects the event and an enemy character is carried out, and other user is allowed to participate in the event for which the battle process is carried out, whereby a plurality of users is allowed to participate in the event as a result. Further, in such an event, there is one in which a user is allowed to add into a battle process started by other user. In one example of the video game processing server 10, the content can become such an event.

Third Embodiment

Figure 13:
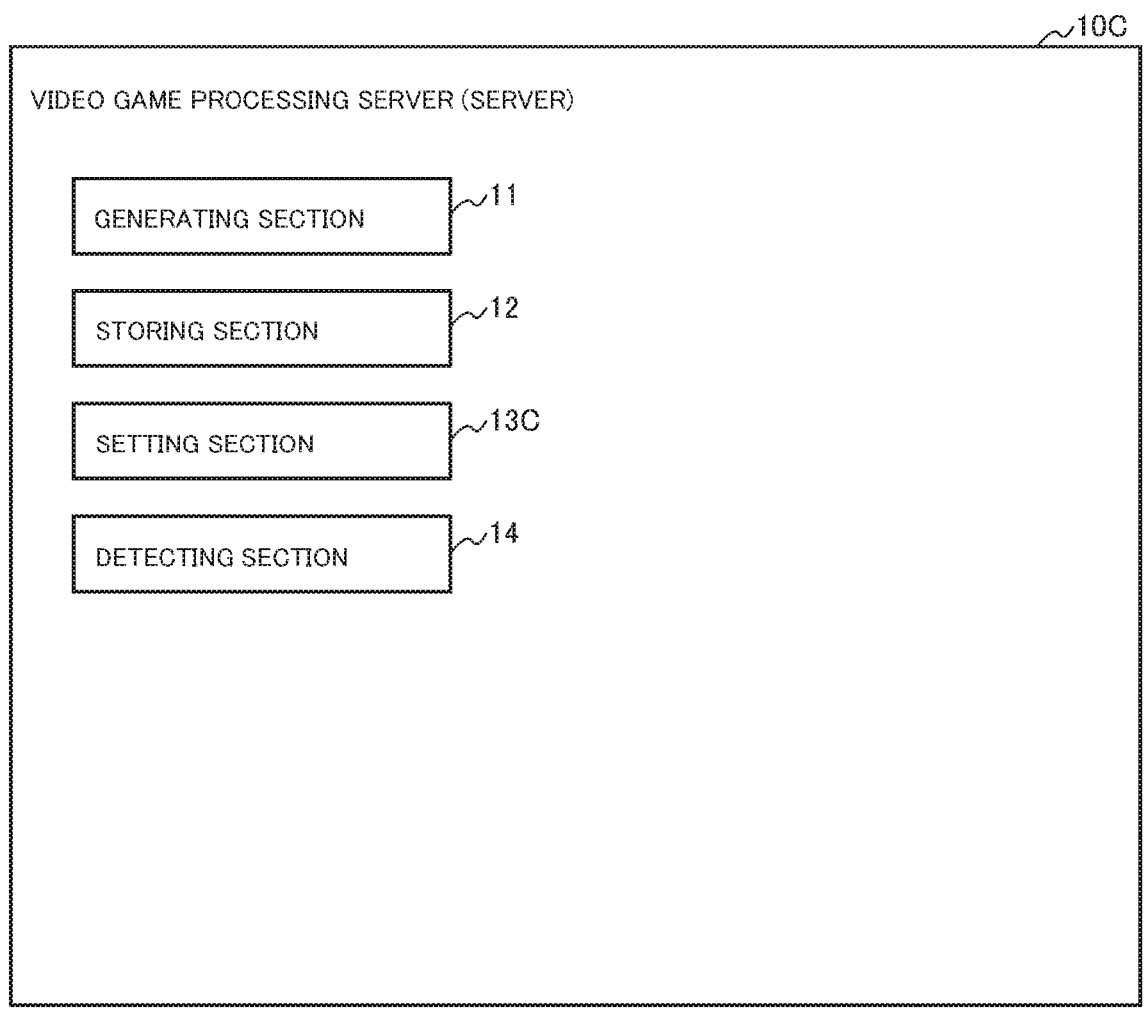
FIG. 13 is a block diagram showing a configuration of the video game processing server corresponding to at least one of the embodiments according to the present invention.

FIG. 13 is a block diagram showing a configuration of a video game processing server 10C (hereinafter, referred to as a "server 10C"), which is an example of the video game processing server 10. In the present embodiment, the server 10C at least includes a generating section 11, a storing section 12, a setting section 13C, and a detecting section 14.

The setting section 13C has a function to set up the degree of difficulty for second content on the basis of the number of users or the number of characters operated by users in a case where the first content does not exist. The users or the characters are positioned within a predetermined range from a position at which the second content is to be generated.

Here, the "predetermined range" is a range that is appropriately set up by the administrator of the system 100. The "predetermined range" includes a distance of a radius x from a central position at which the second content is to be generated, a map to which a position at which the second content is to be generated belongs, for example.

Figure 14:
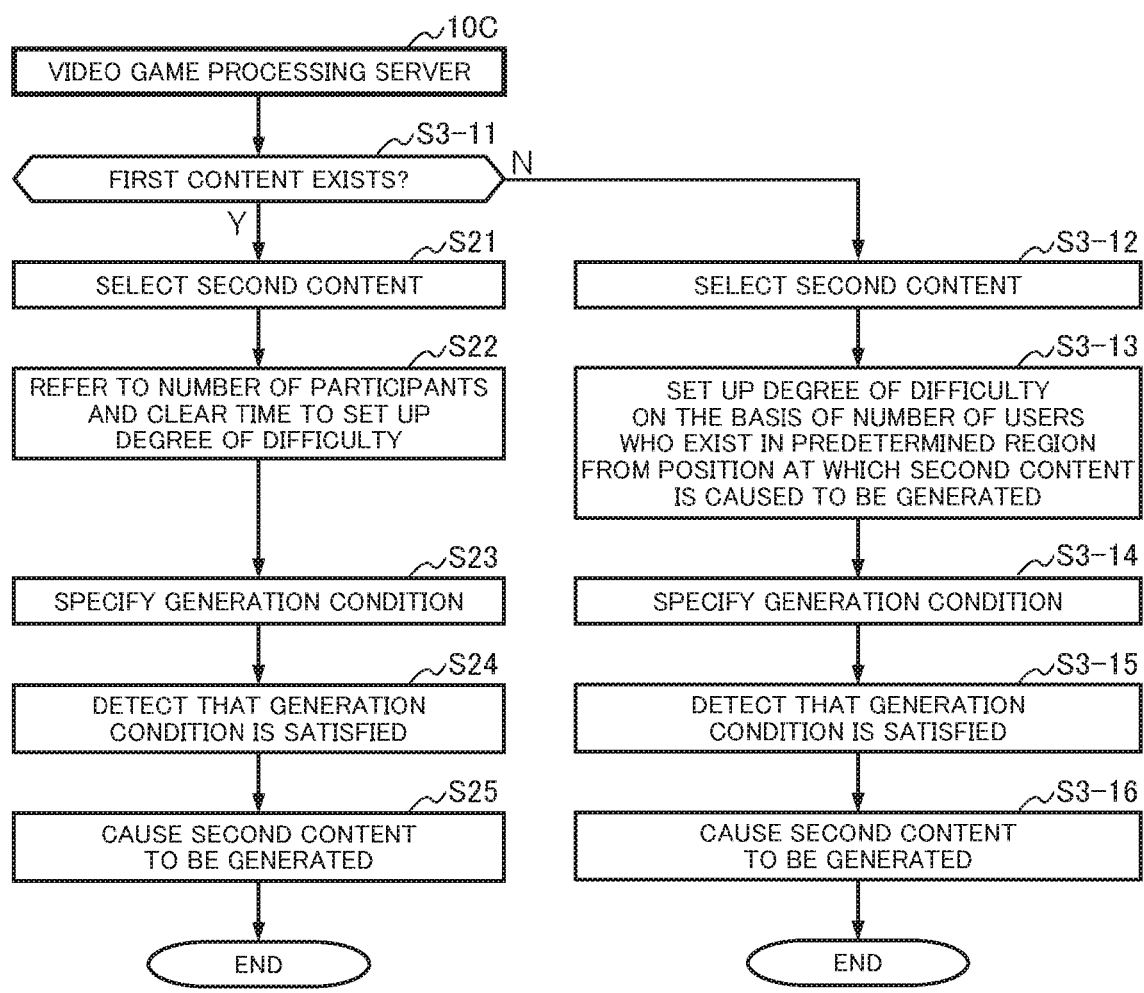
FIG. 14 is a flowchart showing an example of the game processing corresponding to at least one of the embodiments according to the present invention.

FIG. 14 is a flowchart showing an example of the game processing carried out by the system 100. Hereinafter, operations of the server 10C and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

The game processing according to the present embodiment is started at the time of an initial start (boot) of the server 10C, for example. In this regard, the time of initial start-up of the server 10C has been described as an example. However, it is preferable that the game processing according to the present embodiment is applied in a case where there is a possibility that recent content does not exist.

In the game processing, the server 10C first determines whether the first content exists or not (Step S3-11). In a case where it is determined that the first content exists ("Yes" at Step S3-11), the server 10C causes the processing flow to shift to a process to select second content in the game processing (Step S21).

The server 10C then refers to the number of participants in the first content and the clear time for the first content, sets up the degree of difficulty for the selected second content (Step S22), and specifies a generation condition (Step S23). Then, when the server 10C detects that the generation condition is satisfied (Step S24), the server 10C generates the second content with the degree of difficulty thus set up (Step S25), and terminates the processing herein.

On the other hand, in a case where it is determined that the first content does not exist ("No" at Step S3-11), the server 10C selects second content containing information regarding generation portions in the game processing (Step S3-12).

The server 10C then sets up the degree of difficulty for the selected second content on the basis of the number of users positioned within the predetermined range from the position in which the second content is to be generated (Step S3-13).

Then, when the generation condition is specified (Step S3-14) and it is detected that the generation condition is satisfied (Step S3-15), the server 10C generates the second content with the degree of difficulty thus setup (Step S3-16), and terminates the processing herein.

As explained above, as one side of the third embodiment, the video game processing server 10C is configured so as to include the generating section 11, the storing section 12, the setting section 13C, and the detecting section 14. For that reason, the server 10C is configured so as to: generate the content in which at least one user or one character operated by the user is allowed to participate in a case where the predetermined condition is satisfied; refer to the number of participants who participate in the first content indicating content that is recently generated and the clear time indicating a time required to clear the first content to set up the degree of difficulty for the second content indicating content that is to be newly generated; detect whether the generation condition to generate the second content of predetermined conditions is satisfied or not; generate the second content with the degree of difficulty thus set up in a case where it is detected that the generation condition is satisfied; set up the degree of difficulty for the second content on the basis of the number of users or the number of characters operated by the users, which are positioned within a predetermined range from a position at which the second content is to be generated in a case where the first content does not exist; and generate the second content with the degree of difficulty thus set up. This makes it possible to appropriately set up the degree of difficulty for the content to be generated even in a case where the first content does not exist.

Fourth Embodiment

Figure 15:
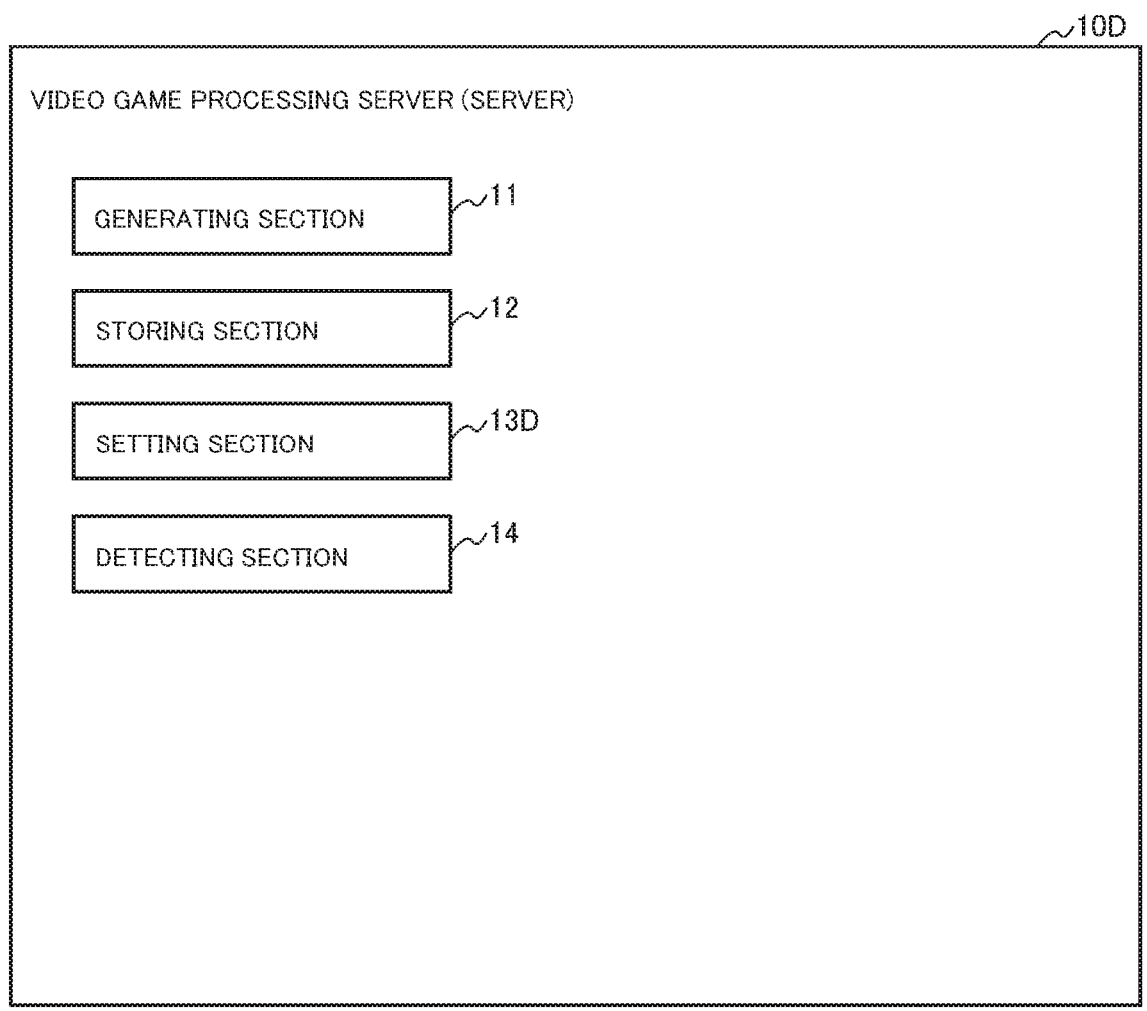
FIG. 15 is a block diagram showing a configuration of the video game processing server corresponding to at least one of the embodiments according to the present invention.

FIG. 15 is a block diagram showing a configuration of a video game processing server 10D (hereinafter, referred to as a "server 10D"), which is an example of the video game processing server 10. In the present embodiment, the server 10D at least includes a generating section 11, a storing section 12, a setting section 13D, and a detecting section 14.

In the storage medium according to the fourth embodiment, information regarding an assumed clear time and information regarding the recommended number of participants of second content are stored. The assumed clear time indicates a time that is assumed to be required to clear first content.

Here, the phrase "time that is assumed to be required to clear the first content" means a time that is assumed to be required to clear content when users of the recommended number, each of who has a recommended level, challenge the content. The assumed clear time is appropriately set up in accordance with a property of the content by the administrator of the system. In the present embodiment, the assumed clear time is set to a time one third of the limited time of the content.

Further, "the recommended number of participants" is a numerical value indicating how many users with a recommended level can clear the content. In the present embodiment, the recommended number of participants is appropriately set up in accordance with the property of the content by the administrator of the system.

The setting section 13D has a function to calculate a first correction value on the basis of the clear time and the assumed clear time.

Here, the "first correction value" may be calculated on the basis of the clear time and the assumed clear time, but the "first correction value" is calculated by [Formula 1] as follows, for example.

[First correction value]=([Limited time of content]−
    [Time that elapses until content is terminated])/
    ([Limited time of content]−[Assumed clear
    time])  [Formula 1]

As shown in Formula 1, the more the time that elapses until content is terminated increases, the smaller the first correction value becomes. Namely, the first correction value is set up so that the first correction value makes smaller as the time that elapses until the content is terminated passes one third (the assumed clear time) of the limited time for the content. On the other hand, in a case where the time that elapses until the content is terminated is earlier than one third (the assumed clear time) of the limited time for the content, the first correction value is set up so as to be made larger.

Further, the setting section 13D has a function to refer to a predetermined first calculating formula to calculate the assumed number of participants by correcting the number of participants in accordance with the first correction value.

Here, the assumed number of participants means the number of users that is assumed to participate in next content. In the present embodiment, since the number of participants for the second content is not limited, it cannot be grasped until the second content is actually started and terminated. For this reason, the server 10D is configured so as to determine the degree of difficulty by using the assumed number of participants. The server 10D may be configured so that the assumed number of participants is calculated in accordance with the first correction value. However, the server 10D is configured so as to use [Formula 2] as follows as a predetermined first calculating formula, for example.

[Assumed number of participants]=[Actual number
    of participants]×[First correction value]  [Formula 2]

As shown in Formula 2, the assumed number of participants is calculated by multiplying the actual number of participants by the first correction value. As described above, the first correction value makes smaller as a time that elapses until the content is terminated becomes longer. Therefore, the assumed number of participants makes smaller than the actual number of participants as the time that elapses until the content is terminated exceeds the assumed clear time. On the other hand, the assumed number of participants makes larger than the actual number of participants as the time that elapses until the content is terminated falls below the assumed clear time.

Further, the setting section 13D has a function to calculate a second correction value on the basis of the assumed number of participants and the recommended number of participants.

Here, the "second correction value" may be calculated on the basis of the assumed number of participants and the recommended number of participants. However, the second correction value is calculated by means of [Formula 3] as follows, for example.

[Second correction value]=[Assumed number of par-
    ticipants]/[Recommended number of partici-
    pants]  [Formula 3]

As shown in formula 3, the second correction value is configured so as to make larger as the assumed number of participants becomes larger.

Moreover, the setting section 13D has a function to refer to a predetermined second calculating formula and set up the degree of difficulty for the second content in accordance with the second correction value.

Here, the second calculating formula is appropriately defined by the administrator of the system 100. For example, the server 10D may be configured so that the second calculating formula multiplies the second correction value by the degree of difficulty that becomes a standard associated with the second content (an HP and an offensive power indicating strength of an enemy character, the number of enemy characters, or the like). Further, the server 10D may be configured so that the second calculating formula multiplies the second correction value, which is adjusted by further multiplying a constant by the second correction value, by the degree of difficulty that becomes a standard.

Figure 16:
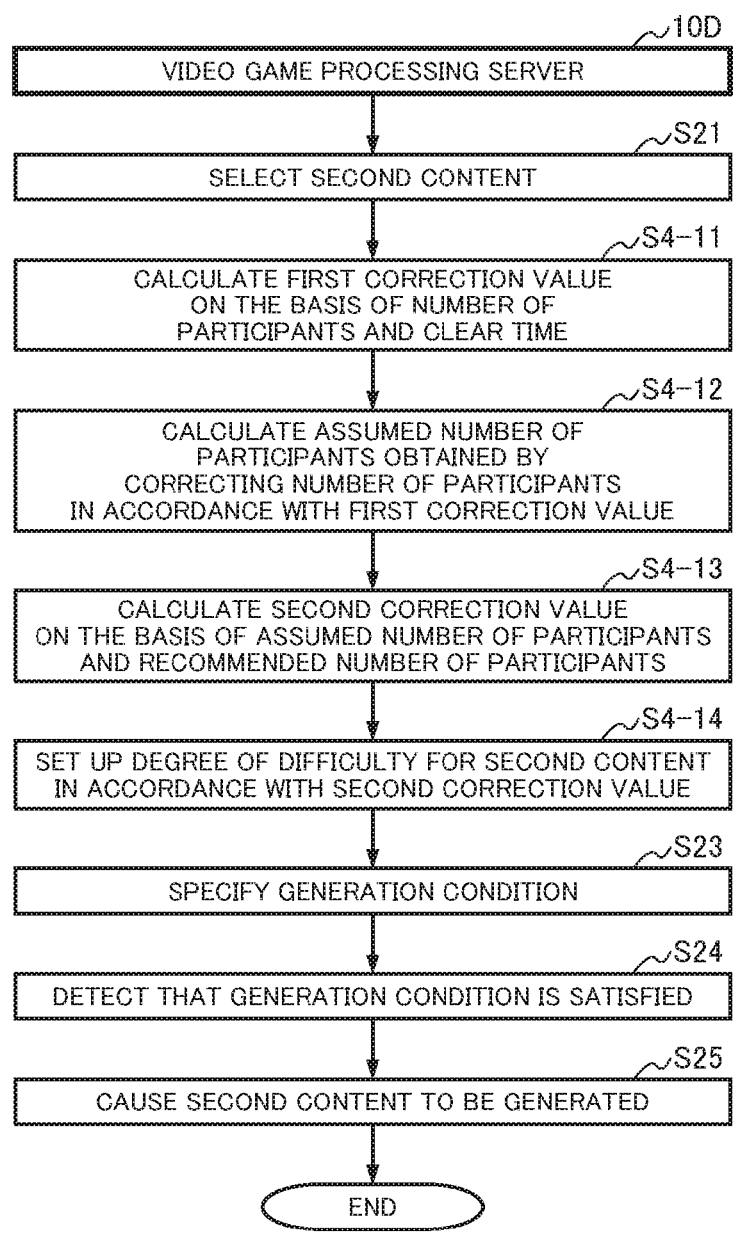
FIG. 16 is a flowchart showing an example of the game processing corresponding to at least one of the embodiments according to the present invention.

FIG. 16 is a flowchart showing an example of the game processing carried out by the system 100. Hereinafter, operations of the server 10D and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

When the second content is selected (Step S21), the server 10D calculates a first correction value on the basis of the number of participants in the first content, the clear time, and the assumed clear time (Step S4-11).

When the first correction value is calculated, the server 10D refers to the predetermined first calculating formula to calculate the assumed number of participants by correcting the number of participants in accordance with the first correction value (Step S4-12).

When the assumed number of participants is calculated, the server 10D calculates the second correction value on the basis of the assumed number of participants and the recommended number of participants (Step S4-13).

When the second correction value is calculated, the server 10D refers to the predetermined second calculating formula to set up the degree of difficulty for the second content in accordance with the second correction value (Step S4-14).

When the degree of difficulty is set up, the server 10D specifies a generation condition (Step S23), and detects whether the generation condition is satisfied or not (Step S24). Then, in a case where it is detected that the generation condition is satisfied, the server 10D generates second content with the degree of difficulty thus set up (Step S25), and terminates the processing herein.

As explained above, as one side of the fourth embodiment, the video game processing server 10D is configured so as to include the generating section 11, the storing section 12, the setting section 13D, and the detecting section 14 wherein the information regarding the assumed clear time and information regarding the recommended number of participants of the second content are stored in the storage medium, the assumed clear time indicating a time that is assumed to be required to clear the first content. For that reason, the video game processing server 10D is configured so as to: calculate the first correction value on the basis of the clear time and the assumed clear time; refer to the predetermined first calculating formula to calculate the assumed number of participants by correcting the number of participants in accordance with the first correction value; calculate the second correction value on the basis of the assumed number of participants and the recommended number of participants; and refer to the predetermined second calculating formula to set up the degree of difficulty for the second content in accordance with the second correction value. Thus, it becomes possible to cause the user to continue his or her desire to participate in content to be generated.

In this regard, it has not been mentioned particularly in the example of the fourth embodiment described above. However, the video game processing server 10D may be configured so that the second calculating formula contains a third calculating formula, which is to be used in a case where the assumed number of participants is more than the recommended number of participants, and a fourth calculating formula, which is to be used in a case where the assumed number of participants is less than the recommended number of participants. For example, the video game processing server 10D may be configured so that a correction amount becomes smaller in a case where the assumed number of participants is less than the recommended number of participants compared with a case where the assumed number of participants is more than the recommended number of participants.

Fifth Embodiment

Figure 17:
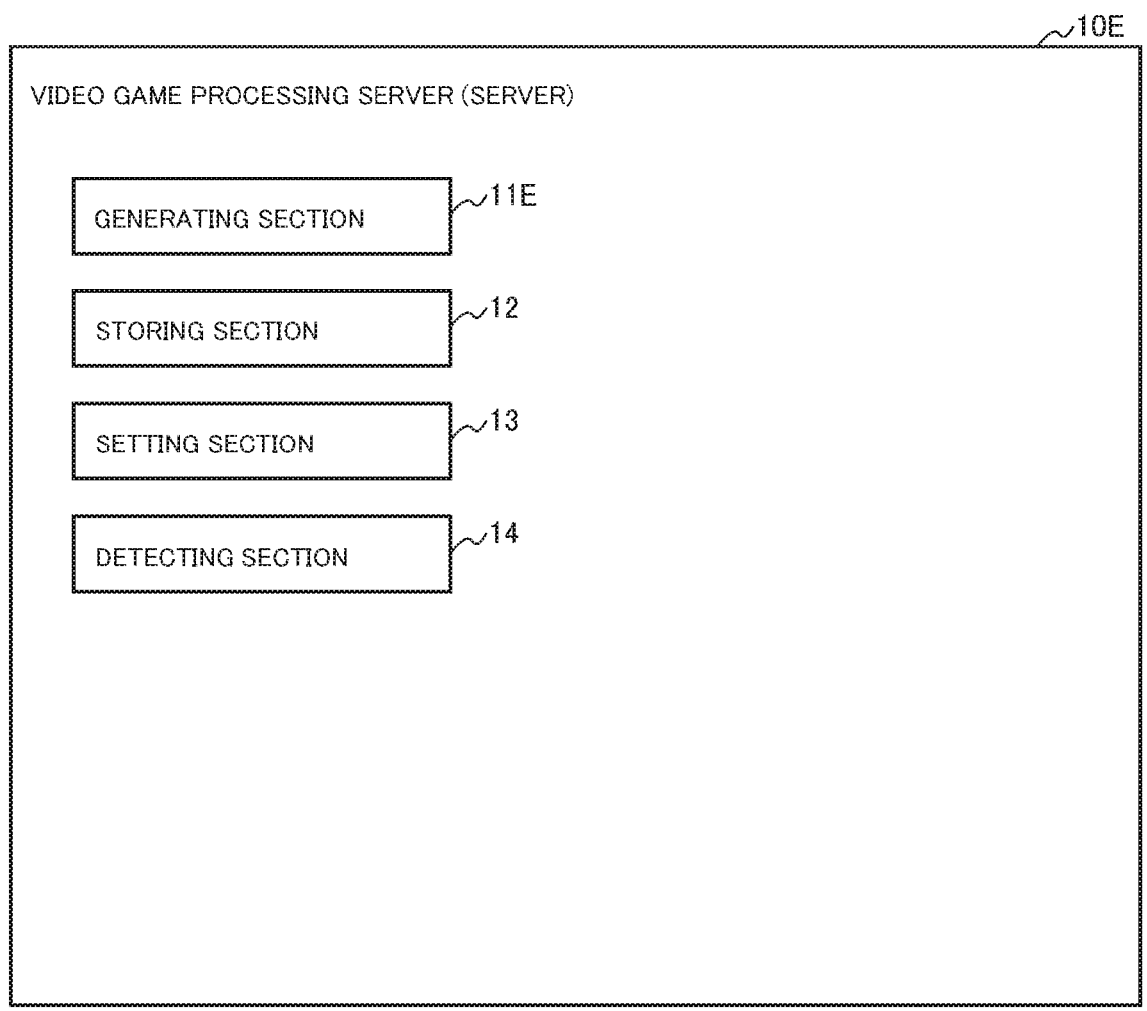
FIG. 17 is a block diagram showing a configuration of the video game processing server corresponding to at least one of the embodiments according to the present invention.

FIG. 17 is a block diagram showing a configuration of a video game processing server 10E (hereinafter, referred to as a "server 10E"), which is an example of the video game processing server 10. In the present embodiment, the server 10E at least includes a generating section 11, a storing section 12, a setting section 13E, and a detecting section 14.

The setting section 13E has a function to cause a character, which is a cooperator of a user but is independent of an operation of the user, to appear in a case where the assumed number of participants falls below the recommended number of participants.

Here, the "character, which is a cooperator of a user but is independent of an operation of the user" means a character that carries out capture of content together with the user, and that is not a user who participates in the content, but is a character prepared by a system side (for example, a non-player character and the like).

Figure 18:
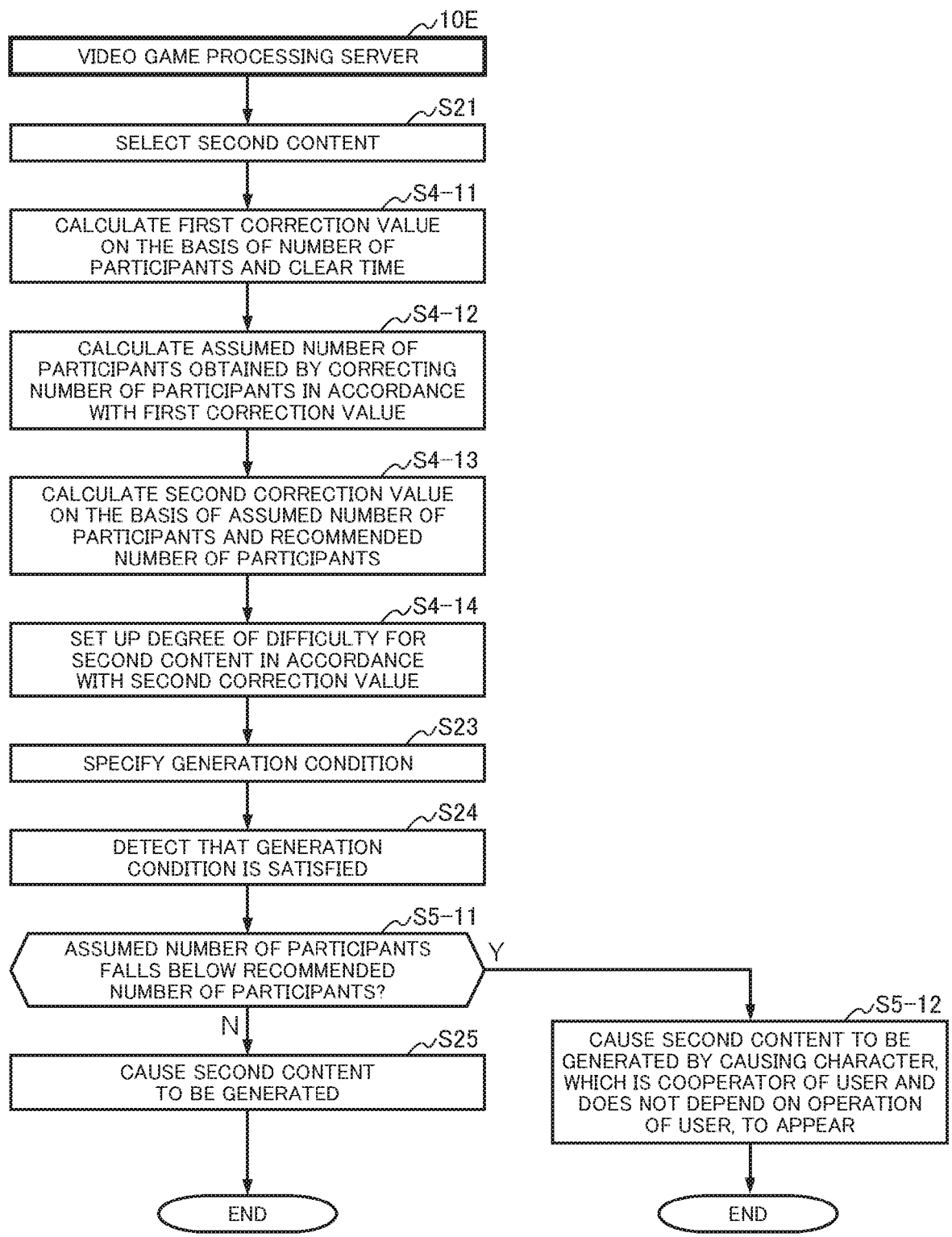
FIG. 18 is a flowchart showing an example of the game processing corresponding to at least one of the embodiments according to the present invention.

FIG. 18 is a flowchart showing an example of the game processing carried out by the system 100. Hereinafter, operations of the server 10E and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

In a case where it is detected that a generation condition is satisfied (Step S24), the server 10E compares the assumed number of participants with the recommended number of participants, and determines whether the assumed number of participants falls below the recommended number of participants or not (Step S5-11).

In a case where it is determined that the assumed number of participants does not fall below the recommended number of participants ("No" at Step S5-11), the server 10E generates second content with the degree of difficulty thus set up (Step S25), and terminates the processing herein.

On the other hand, in a case where it is determined that the assumed number of participants falls below the recommended number of participants ("Yes" at Step S5-11), the server 10E generate the second content with the degree of difficulty thus set up by causing a character, which is a cooperator of the user and is independent of an operation of the user, to appear (Step S5-12). The server 10E then terminates the processing herein.

As explained above, as one side of the fifth embodiment, the video game processing server 10E is configured so as to include the generating section 11, the storing section 12, the setting section 13E, and the detecting section 14. For that reason, the server 10E causes a character, which is a cooperator of the user and is independent of an operation of the user to appear in a case where the assumed number of participants falls below the recommended number of participants. Thus, it becomes possible to cause the user to continue his or her desire to participate in content to be generated.

In this regard, it has not been mentioned particularly in the example of the fifth embodiment described above. However, the video game processing server 10E may be configured so that the number of characters to be caused to appear is determined on the basis of the assumed number of participants and the recommended number of participants. In this case, information in which the number of appearing characters is associated with a ratio of the assumed number of participants and the recommended number of participants may be stored in the storage medium.

In this regard, it has not been mentioned particularly in the example of the fifth embodiment described above. However, the video game processing server 10E may be configured so that the number of characters caused to appear is changed in accordance with the number of users who participate in the second content at present. In this case, the system 100 may be configured so as to: detect a transition of the number of users who participate in the second content at present; and cause a character, which is a cooperator of the user and is independent of an operation of the user, to appear or disappear in the transition.

In this regard, it has not been mentioned particularly in the example of the first embodiment described above. However, the server 10E may be configured so that: the information indicating the basic degree of difficulty, which is a standard for the second content, is stored in the storage medium; the basic degree of difficulty is corrected so as to reduce the degree of difficulty in a case where the assumed number of participants falls below the recommended number of participants; and the basic degree of difficulty is corrected so as to increase the degree of difficulty in a case where the assumed number of participants exceeds the recommended number of participants.

Sixth Embodiment

Figure 19:
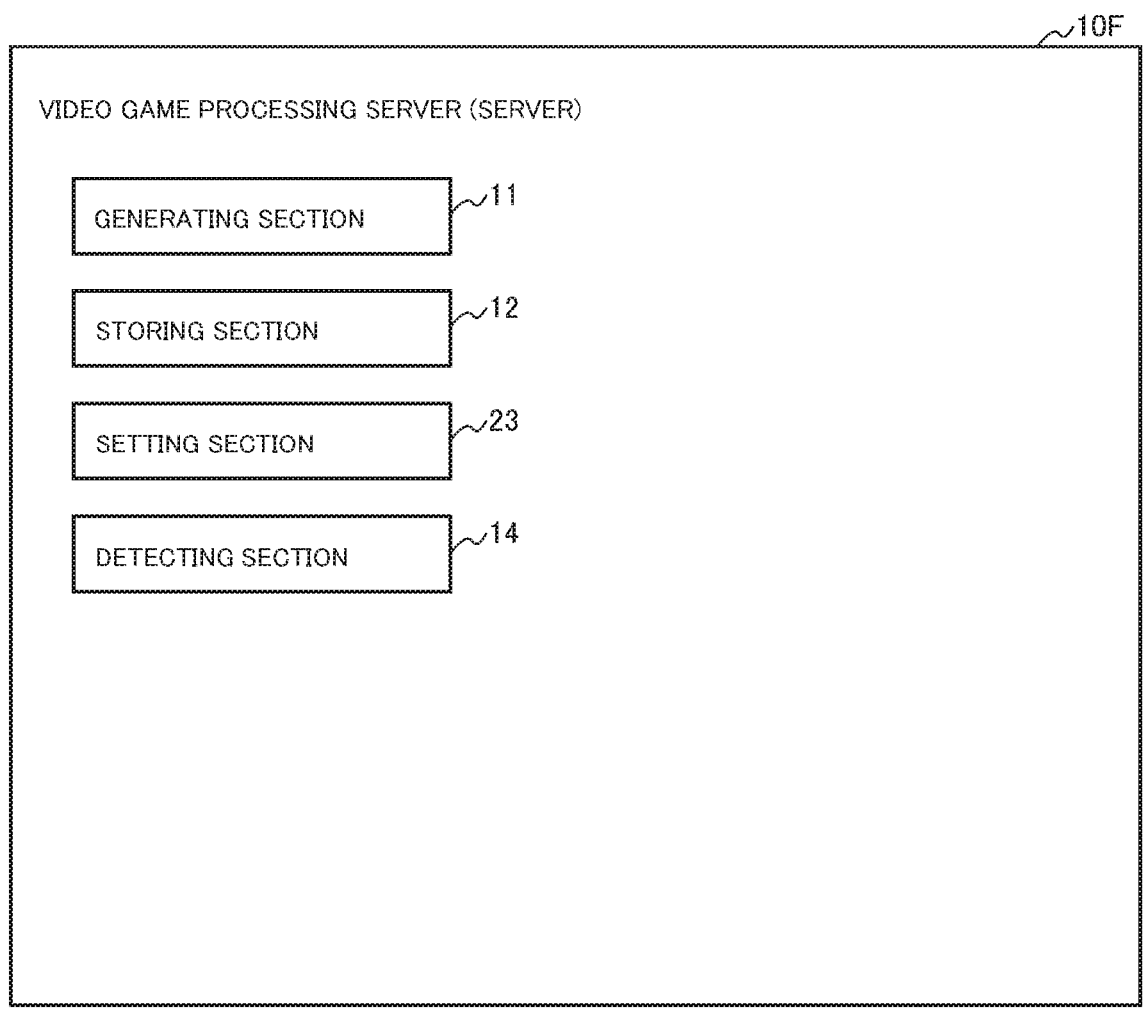
FIG. 19 is a block diagram showing a configuration of the video game processing server corresponding to at least one of the embodiments according to the present invention.

FIG. 19 is a block diagram showing a configuration of a video game processing server 10F (hereinafter, referred to as a "server 10F"), which is an example of the video game processing server 10. In the present embodiment, the server 10F at least includes a generating section 11, a storing section 12, a setting section 23, and a detecting section 14.

The setting section 23 has a function to refer to a clear time and set up the degree of difficulty for content to be generated newly.

FIG. 20 is a flowchart showing an example of game processing carried out by the system 100. Hereinafter, operations of the server 10F and the terminal 20 will be described as an example. In this regard, a flowchart that shows an operation of the terminal 20 is omitted from a point of view to avoid repeated explanation. Further, the same Steps as the Steps that have been explained as an example of the embodiment described above may be omitted from a point of view to avoid repeated explanation.

When the second content is selected (Step S21), the server 10F refers to the clear time of the first content, and sets up the degree of difficulty for the selected second content (Step S6-11).

When the degree of difficulty is set up, the server 10F specifies a generation condition (Step S23), and detects whether the generation condition is satisfied or not (Step S24). The server 10F then generates the second content with the degree of difficulty thus set up (Step S25), and terminates the processing herein.

As explained above, as one side of the sixth embodiment, the video game processing server 10F for controlling progress of the video game in response to an operation of the user is configured so as to include the generating section 11, the storing section 12, the setting section 23, and the detecting section 14. For that reason, the video game processing server 10F is configured so as to: generate content in which at least one user or at least one character operated by the user is allowed to participate; store, in the predetermined storage medium, the clear time indicating a time required to clear the first content in a case where the predetermined condition is satisfied; refer to the clear time to set up the degree of difficulty for the second content indicating content that is newly generated; and detect whether the generation condition to generate the second content of predetermined conditions is satisfied or not. This makes it possible to generate the second content with the degree of difficulty thus set up in a case where it is detected that the generation condition is satisfied. Therefore, it becomes possible to appropriately set up the degree of difficulty for the content.

In this regard, in each of the embodiments described above, each of the plurality of user terminals 20 and 201 to 20N and the video game processing server 10 carries out the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as the example of the respective embodiments described above. For example, the video game processing system 100 may be configured so that part or all of the processing that has been explained as the processing carried out by the user terminal is carried out by the server 10, or it may be configured so that part or all of the processing that has been explained as the processing carried out by the server 10 is carried out by any of the plurality of user terminals 20 and 201 to 20N (for example, the user terminal 20). Further, it may be configured so that a part or all of the storing sections included by the server 10 is included in any of the plurality of user terminals 20 and 201 to 20N. Namely, it may be configured so that a part or all of the functions included in any one of the user terminal 201 and the video game processing server 10 according to the video game processing system 100 is included in the other.

Namely, for example, the video game processing system 100 may be configured so that the video game processing server 10 generates information regarding the game screen to be outputted to a display screen of a display device, or so that the terminal 20 generates such information. In this regard, in a case where the video game processing server 10 generates the information regarding the game screen, the game screen is outputted in the terminal 20 as a game screen of a cloud gaming.

Further, the video game processing program may be configured so as to cause a single video game processing apparatus that does not include a communication network to realize a part or all of the functions that have been explained as the examples of the respective embodiments described above.

In this regard, it has not been mentioned particularly in the example of each of the embodiments described above. However, the system 100 may be configured so as to store content related information, in which various kinds of information regarding the content are associated with each other, in a storage medium. FIG. 21 is an explanatory drawing showing a storage example of the content related information. As shown in FIG. 21, the content related information contains an ID of content, coordinates of a central point, a region, a limited time, the basic degree of difficulty, the maximum number of enemy characters that appear within the range at the same time, a monster ID, the recommended number of participants, an item ID to be collected, a basic reward (experience point), a basic reward (currency), a basic reward (item), an ID of next content at the time of clear, an ID of next content at the time of failure, a basic time until the content is generated, and the like. The system 100 is configured so that the various kinds of information are contained in the content related information shown in FIG. 21. In each of the embodiments described above, the system 100 may be configured so that only the information necessary for the processing is contained in the content related information. The system 100 then refers to the content related information as needed to carry out the game processing and the storing processing.

In this regard, it has not been mentioned particularly in the example of each of the embodiments described above. However, the system 100 may be configured so that the content contains plural kinds of systems; and so as to generate content that belongs to any system. Here, the word "system" denotes a property of a final target of the content. For example, as an example of the content belonging to one system, there is content having a target in which the specified number of groups of monsters or more are defeated within a limited time. Further, as another example, there is content having a target in which a specified non-player character is guarded from a first spot to a second spot within a limited time. Further, as still another example, there is content having a target in which an item requested to collect from a non-player character is got and delivered to the non-player character.

APPENDIX

The explanation of the embodiments described above has been described so that the following inventions can be at least realized by a person having a normal skill in the art to which the present invention belongs.

(1)

A non-transitory computer-readable medium including a video game processing program product for causing a server to realize functions to control progress of a video game in response to an operation of a user, wherein the functions include:

a generating function configured to generate content in a case where a predetermined condition is satisfied, at least one of the user or a character operated by the user being allowed to participate in the content;

a storing function configured to store the number of participants who participate in first content and a clear time in a predetermined storage medium, the first content indicating one content of the contents which is recently generated, the clear time indicating a time required to clear the first content;

a setting function configured to refer to the number of participants and the clear time to set up the degree of difficulty for second content, the second content indicating content to be generated newly; and a detecting function configured to detect whether a generation condition is satisfied or not, the generation condition being contained in the predetermined condition, the generation condition being a condition to generate the second content, wherein the generating function includes a function configured to generate the second content with the degree of difficulty that was set up by the setting function in a case where the detecting function detects that the generation condition is satisfied.

(1-1)

According to another aspect of the present disclosure, the generating function includes a function configured to suddenly generate content in a case where a predetermined condition is satisfied, at least one of the user being allowed to participate in the content.

(1-2)

According to another aspect of the present disclosure, the setting function includes a function configured to refer, when the degree of difficulty for the second content is determined, to the user who plays the video game when the second content is generated and to set up the degree of difficulty for the second content.

(1-3)

According to another aspect of the present disclosure, the setting function includes a function configured to refer, when the degree of difficulty for the second content is determined, to the number of users each of who has a predetermined strength or status (for example, a level of the user or a job of the user; more specifically, a level that falls into a range of ten difference with respect to a recommended level of the content, a predetermined job, and the like) to set up the degree of difficulty for the second content.

(1-4)

According to another aspect of the present disclosure, the setting function includes a function configured to refer, when the degree of difficulty for the second content is determined, to the number of users who possess an in-game element for participating in predetermined content to set up the degree of difficulty for the second content.

(1-5)

According to another aspect of the present disclosure, the setting function includes a function configured to refer to the number of users or the number of characters operated by the users in addition to the number of participants and the clear time to set up the degree of difficulty for the second content, the users or characters being positioned within a predetermined range from a position at which the second content is to be generated.

(2)

According to another aspect of the present disclosure, the generating function includes a function configured to generate the content at a predetermined position in a region in which the user or the character operated by the user is allowed to move.

(2-1)

According to another aspect of the present disclosure, the content is content that is generated in a virtual space of the video game in which a large number of users participate in the same virtual space at the same time, and wherein the generating function includes a function configured to generate the second content to be generated in the virtual space at a predetermined position on a field within the virtual space.

(2-2)

According to another aspect of the present disclosure, the content is content for which a dedicated space is generated, and the generating function includes a function configured to generate the second content by generating a space dedicated to the second content with the degree of difficulty thus set up.

(3)

According to another aspect of the present disclosure, the setting function includes a function configured to set up the degree of difficulty for the second content on the basis of the number of users or the number of characters operated by the users in a case where the first content does not exist, the users or the characters being positioned within a predetermined range from a position at which the second content is to be generated.

(4)

According to another aspect of the present disclosure, information regarding an assumed clear time and information regarding the recommended number of participants of the second content are stored in the storage medium, the assumed clear time indicating a time that is assumed to be required to clear the first content, and wherein the setting function includes:

a function configured to calculate a first correction value on the basis of the clear time and the assumed clear time;

a function configured to refer to a predetermined first calculating formula to calculate the assumed number of participants obtained by correcting the number of participants in accordance with the first correction value;

a function configured to calculate a second correction value on the basis of the assumed number of participants and the recommended number of participants; and a function configured to refer to a predetermined second calculating formula to set up the degree of difficulty for the second content in accordance with the second correction value.

(4-1)

According to another aspect of the present disclosure, the second calculating formula contains:

a third calculating formula that is to be used in a case where the assumed number of participants is more than the recommended number of participants; and a fourth calculating formula that is to be used in a case where the assumed number of participants is less than the recommended number of participants.

(5)

According to another aspect of the present disclosure, the setting function includes a function configured to cause a second character, which is a cooperator of the user, to appear in a case where the assumed number of participants falls below the recommended number of participants, the second character being independent of an operation of the user.

(6)

According to another aspect of the present disclosure, information indicating a basic degree of difficulty, which is a standard of the second content, is stored in the storage medium, and wherein the setting function includes:

a function configured to carry out a correction for the basic degree of difficulty so as to reduce the degree of difficulty in a case where the assumed number of participants falls below the recommended number of participants; and a function configured to carry out a correction for the basic degree of difficulty so as to increase the degree of difficulty in a case where the assumed number of participants exceeds the recommended number of participants.

(7-1)

According to another aspect of the present disclosure, the functions further include:

a function configured to determine a start time of the second content, wherein the detecting function includes a function configured to detect whether the generation condition is satisfied or not by detecting whether it is the start time or not.

(7-1-1)

According to another aspect of the present disclosure, the functions further include:

a function configured to make a generation interval of the second content longer than the usual when the content ends in failure the predetermined number of times in a row.

(7-2)

According to another aspect of the present disclosure, the functions further include:

a function configured to generate the generation condition within a region in which the user or the character operated by the user is allowed to move, and wherein the detecting function includes a function configured to detect whether the generation condition is satisfied or not in accordance with an operation of the user against the generation condition that is generated within the region.

(8-1)

According to another aspect of the present disclosure, the functions further include:

a function configured to give, when the content is terminated, a reward to the user or the character operated by the user that participates in the content, and wherein the function to give a reward includes a function configured to increase or reduce the reward to be given in accordance with the degree of contribution with respect to the content (8-2)

According to another aspect of the present disclosure, the function to give a reward includes a function configured to give a reward regardless of whether the content is succeeded or not.

(9)

According to another aspect of the present disclosure, continuous content that is generated so as to be linked together is contained in the content, wherein the functions further includes:

a function configured to determine whether the continuous content is contained in the second content or not, and wherein the generating function includes a function configured to generate, when the second content is terminated, continuous content in a case where it is determined that the continuous content is contained.

(10)

A non-transitory computer-readable medium including a video game processing program product for causing a user terminal to realize at least one function of the functions that the server is caused to realize in accordance with any of the non-transitory computer-readable medium noted above, the user terminal being allowed to communicate with the server.

(11)

A server in which any of the video game processing program described above is installed.

(12)

A video game processing system including a communication network, a server and a user terminal, the video game processing system being configured to control progress of a video game in response to an operation of a user, the video game processing system comprising:

a generating section configured to generate content in a case where a predetermined condition is satisfied, at least one of the user or a character operated by the user being allowed to participate in the content;

a storing section configured to store the number of participants who participate in first content and a clear time in a predetermined storage medium, the first content indicating one content of the contents which is recently generated, the clear time indicating a time required to clear the first content;

a setting section configured to refer to the number of participants and the clear time to set up the degree of difficulty for second content, the second content indicating content to be generated newly; and a detecting section configured to detect whether a generation condition is satisfied or not, the generation condition being contained in the predetermined condition, the generation condition being a condition to generate the second content, wherein the generating section generates the second content with the degree of difficulty that was set up by the setting section in a case where the detecting section detects that the generation condition is satisfied.

(13)

According to another aspect of the present disclosure, the server comprises the generating section, the storing section, the setting section and the detecting section, and wherein the user terminal comprises:

an outputting section configured to output a game screen to a display screen of a display device, the game screen indicating a progress status of the video game.

(14)

A non-transitory computer-readable medium including a video game processing program product for causing a user terminal to realize functions to control progress of a video game in response to an operation inputted into the user terminal by a user, wherein the server includes:

a generating function configured to generate content in a case where a predetermined condition is satisfied, at least one of the user or a character operated by the user being allowed to participate in the content;

a storing function configured to store the number of participants who participate in first content and a clear time in a predetermined storage medium, the first content indicating one content of the contents which is recently generated, the clear time indicating a time required to clear the first content;

a setting function configured to refer to the number of participants and the clear time to set up the degree of difficulty for second content, the second content indicating content to be generated newly; and a detecting function configured to detect whether a generation condition is satisfied or not, the generation condition being contained in the predetermined condition, the generation condition being a condition to generate the second content, wherein the generating function includes a function configured to generate the second content with the degree of difficulty that was set up by the setting function in a case where the detecting function detects that the generation condition is satisfied, and wherein the functions includes:

a receiving function configured to receive, from the server, information for outputting a game screen indicating a progress status of the video game.

(15)

A non-transitory computer-readable medium including a video game processing program product for causing a user terminal to realize functions to progress of a video game in response to an operation of a user, wherein the functions include:

a generating function configured to generate content in a case where a predetermined condition is satisfied, at least one of the user or a character operated by the user being allowed to participate in the content;

a storing function configured to store the number of participants who participate in first content and a clear time in a predetermined storage medium, the first content indicating one content of the contents which is recently generated, the clear time indicating a time required to clear the first content;

a setting function configured to refer to the number of participants and the clear time to set up the degree of difficulty for second content, the second content indicating content to be generated newly; and a detecting function configured to detect whether a generation condition is satisfied or not, the generation condition being contained in the predetermined condition, the generation condition being a condition to generate the second content, wherein the generating function includes a function configured to generate the second content with the degree of difficulty that was set up by the setting function in a case where the detecting function detects that the generation condition is satisfied.

(16)

According to another aspect of the present disclosure, a server is caused to realize at least one function of the functions that the user terminal is caused to realize, the server being capable of communicating with the user terminal.

(17)

A user terminal into which the video game processing program included in any of the above noted non-transitory computer-readable medium is installed.

(18)

A video game processing method of controlling progress of a video game in response to an operation of a user, the video game processing method comprising:

a generating process configured to generate content in a case where a predetermined condition is satisfied, at least one of the user or a character operated by the user being allowed to participate in the content;

a storing process configured to store the number of participants who participate in first content and a clear time in a predetermined storage medium, the first content indicating one content of the contents which is recently generated, the clear time indicating a time required to clear the first content;

a setting process configured to refer to the number of participants and the clear time to set up the degree of difficulty for second content, the second content indicating content to be generated newly; and a detecting process configured to detect whether a generation condition is satisfied or not, the generation condition being contained in the predetermined condition, the generation condition being a condition to generate the second content, wherein the generating process includes a process configured to generate the second content with the degree of difficulty that was set up in the setting process in a case where it is detected in the detecting process that the generation condition is satisfied.

(19)

A video game processing method carried out by a video game processing system for controlling progress of a video game in response to an operation inputted to a user terminal by a user, the video game processing system comprising a communication network, a server and the user terminal, the video game processing method comprising:

a generating process configured to generate content in a case where a predetermined condition is satisfied, at least one of the user or a character operated by the user being allowed to participate in the content;

a storing process configured to store the number of participants who participate in first content and a clear time in a predetermined storage medium, the first content indicating one content of the contents which is recently generated, the clear time indicating a time required to clear the first content;

a setting process configured to refer to the number of participants and the clear time to set up the degree of difficulty for second content, the second content indicating content to be generated newly; and a detecting process configured to detect whether a generation condition is satisfied or not, the generation condition being contained in the predetermined condition, the generation condition being a condition to generate the second content, wherein the generating process includes a process configured to generate the second content with the degree of difficulty that was set up in the setting process in a case where it is detected in the detecting process that the generation condition is satisfied.

(0141)

According to one of the embodiments of the present invention, it is useful to generate contents.

(0142)

According to one of the embodiments of the present invention, it is useful to generate contents.

What is claimed is:

1. A non-transitory computer-readable medium including a video game processing program product for causing a server to execute functions to control progress of a video game in response to an operation of a user, wherein the functions include:

a generating function configured to generate content in a case where a predetermined condition is satisfied, at least one of the user or a character operated by the user being allowed to participate in the content;

a storing function configured to store a number of participants who participate in first content and a clear time of the first content in a predetermined storage medium, the first content being a previously cleared content, the first content indicating one content among a plurality of generated contents, and the clear time indicating a time required to clear the first content;

a setting function configured to refer to the number of participants and the clear time of the first content that has been previously cleared to set up a degree of difficulty for second content, the second content indicating content to be newly generated; and a detecting function configured to detect whether a generation condition is satisfied or not, the generation condition being contained in the predetermined condition, the generation condition being a condition to generate the second content, wherein the setting function includes a function configured to set up the degree of difficulty for the second content based on a number of users or a number of characters operated by the users positioned within a predetermined range from a position at which the second content is to be generated, and wherein the generating function includes a function configured to generate the second content with the degree of difficulty set up by the setting function in a case where the detecting function detects that the generation condition is satisfied.

2. The non-transitory computer-readable medium according to claim 1, wherein the content includes an event.

3. The non-transitory computer-readable medium according to claim 2, wherein the video game includes a social game, and wherein the event includes a raid battle in the social game.

4. The non-transitory computer-readable medium according to claim 1, wherein the generating function includes a function configured to generate the content at a predetermined position in a region in which the user or the character operated by the user is allowed to move.

5. The non-transitory computer-readable medium according to claim 1, wherein the setting function includes the function configured to set up the degree of difficulty for the second content based on the number of users or the number of characters operated by the users in a case where the first content does not exist, the users or the characters being positioned within the predetermined range from the position at which the second content is to be generated.

6. The non-transitory computer-readable medium according to claim 1, wherein the setting function includes a function configured to cause another character, which is a cooperator of the user, to appear in a case where an assumed number of participants falls below a recommended number of participants, the other character being independent of an operation of the user.

7. The non-transitory computer-readable medium according to claim 1, wherein information indicating a basic degree of difficulty, which is a standard of the second content, is stored in the predetermined storage medium, and wherein the setting function includes:

a function configured to carry out a correction for the basic degree of difficulty to reduce the degree of difficulty in a case where an assumed number of participants falls below a recommended number of participants; and a function configured to carry out a correction for the basic degree of difficulty to increase the degree of difficulty in a case where the assumed number of participants exceeds the recommended number of participants.

* * * * *